United States Patent
Yasui et al.

(10) Patent No.: US 8,082,087 B2
(45) Date of Patent: Dec. 20, 2011

(54) MOTION CONTROL DEVICE FOR VEHICLE

(75) Inventors: Yoshiyuki Yasui, Nagoya (JP); Keita Nakano, Hamamatsu (JP); Chihiro Nitta, Aichi-ken (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 360 days.

(21) Appl. No.: 12/414,942

(22) Filed: Mar. 31, 2009

(65) Prior Publication Data

US 2009/0248269 A1   Oct. 1, 2009

(30) Foreign Application Priority Data

Mar. 31, 2008   (JP) .................................. 2008-090155
Mar. 19, 2009   (JP) .................................. 2009-067280

(51) Int. Cl.
*B60T 7/12*   (2006.01)

(52) U.S. Cl. ........................................................ 701/74
(58) Field of Classification Search .................... 701/70, 701/74, 80, 83
See application file for complete search history.

(56) References Cited

U.S. PATENT DOCUMENTS

| 5,702,165 A | 12/1997 | Koibuchi |
| 7,066,560 B2 * | 6/2006 | Kato et al. ..................... 303/140 |
| 7,125,086 B2 * | 10/2006 | Tanaka et al. ................. 303/190 |

FOREIGN PATENT DOCUMENTS

| JP | 8-310366 A | 11/1996 |
| JP | 2006-300086 A | 11/2006 |
| JP | 2007-223390 A | 9/2007 |
| JP | 2007-331659 A | 12/2007 |

* cited by examiner

*Primary Examiner* — Kim T Nguyen
(74) *Attorney, Agent, or Firm* — Buchanan Ingersoll & Rooney PC

(57) ABSTRACT

A motion control device for a vehicle includes a controlling means for maintaining a traveling stability of the vehicle by controlling a braking force of a wheel of the vehicle, a friction coefficient obtaining means for obtaining a friction coefficient of a road surface on which the vehicle travels, a lateral force reference value calculating means for calculating a lateral force reference value acting on the wheel on the basis of the friction coefficient of the road surface and a lateral force actual value obtaining means for obtaining a lateral force actual value acting on the wheel, wherein the controlling means controls the braking force on the basis of a comparison result between the lateral force reference value and the lateral force actual value.

18 Claims, 14 Drawing Sheets

FIG. 13

Intervene control mode calculating means — B10

| Condition | Target wheel Siv** | Intervene Control mode Miv** |
|---|---|---|
| Fyk#<=Fya# ($\Delta$Fy#=0) | None | — |
| Fykf>Fyaf ($\Delta$Fyf<0) | At least one of two front wheels (turning outer front wheel) | Maintaining mode ($\Delta$Fyf>=dfy5) Decreasing mode ($\Delta$Fyf<dfy5) |
| | At least one of two rear wheels (turning inner rear wheel) | Increasing mode |
| Fykr>Fyar ($\Delta$Fyr<0) | At least one of two rear wheels (turning inner rear wheel) | Maintaining mode ($\Delta$Fyr>=dfy6) Decreasing mode ($\Delta$Fyr<dfy6) |
| | At least one of two front wheels (turning outer front wheel) | Increasing mode |

Inputs: Fyk#, Fya#
Outputs: Siv, Miv

MOTION CONTROL DEVICE FOR VEHICLE

CROSS REFERENCE TO RELATED APPLICATIONS

This application is based on and claims priority under 35 U.S.C. §119 to Japanese Patent Application 2008-090155, filed on Mar. 31, 2008 and Japanese Patent Application 2009-067280, filed on Mar. 19, 2009, the entire contents of which are incorporated herein by reference.

FIELD OF THE INVENTION

The present invention relates to a motion control device for a vehicle.

BACKGROUND

A motion control device for executing a vehicle stabilizing control for controlling a braking force (braking torque) acting on a wheel of a vehicle, in order to maintain traveling stability of the vehicle, on the basis of a motion state quantity (yaw rate and the like) of the vehicle, has been widely known (i.e., JPH8-310366A).

Another motion control device for executing a slip restricting control for controlling the braking force (braking torque) acting on the wheel of the vehicle, by restricting a longitudinal slip of the wheel on the basis of the wheel speed of the vehicle, in order to maintain the traveling stability of the vehicle, has been also widely known.

As indicated by the graph illustrated in FIG. 14, according to a characteristic of a tire (pneumatic tire), a longitudinal force (braking force) Fx has a trade-off relationship with a lateral force Fy. The graph of FIG. 14 shows characteristics Ch1 through Ch 4 each of which indicating a Fx-Fy characteristic. Specifically, at each of the characteristics Ch1 through Ch 4, a unique wheel steer angle (e.g., slip angle α) maintained to be a constant value is set respectively, and a braking torque is increased from zero (0) in order to increase a longitudinal slip occurring at the wheel (e.g., slip ratio Sp) from 0% to 100%. The characteristic Ch 1 indicates a case where the slip angle α is relatively small, and the characteristic Ch 4 indicates a case where the slip angle α is relatively large.

For example, according to the characteristic Ch 3 in the graph of FIG. 14, in a case where the slip ratio Sp is gradually increased while the slip angle α is maintained to be a certain constant value, the relationship between Fx and Fy changes as starting from a point A corresponding to 0% of the slip ratio Sp (Sp=0%), and passing a point B, and then passing a point C at which the level of Fx reaches its maximum, and finally reaching a point D corresponding to a locked state of the tire (Sp=100%). A friction circle of the tire (wheel) indicates a range of a force generated at the tire, and a dashed line in the graph of FIG. 14 indicates the friction circle of the tire.

During the slip ratio Sp increasing process, the Fx-Fy characteristic has firstly a "range in which a decreasing amount of a lateral force Fy is small relative to an increase of a longitudinal force Fx (a braking force Fx)" (e.g., at the characteristic Ch3, a range from the point A to the vicinity of the point B), and then a "range in which the decreasing amount of the lateral force Fy is large relative to the increase of the longitudinal force Fx (the braking force Fx)" (e.g., at the characteristic Ch3, a range from the vicinity of the point B to the point D) continues.

At this point, in a case where a condition of the tire corresponds to the "range in which the decreasing amount of the lateral force Fy is small relative to the increase of the longitudinal force Fx (the braking force Fx)", because the decreasing amount of the lateral force Fy, in other words a force being balanced with centrifugal force, is small yet, an increase of the turning radius of the vehicle may be restricted. On the other hand, in a case where the condition of the tire corresponds to the "range in which the decreasing amount of the lateral force Fy is large relative to the increase of the longitudinal force Fx (the braking force Fx)", because the lateral force Fy has been reduced to some extent, the turning radius of the vehicle may easily increase.

The present invention has been made to deal with the above-mentioned drawbacks, and a purpose of the invention, according to the motion control device for the vehicle for maintaining the traveling stability thereof by controlling the braking force at the wheel of the vehicle, is to provide a device for restricting the Increase of the turning radius of the vehicle caused by a lack of the lateral force, in view of the lateral force at the wheel.

SUMMARY OF THE INVENTION

According to an aspect of the present invention, a motion control device for a vehicle includes a controlling means for maintaining a traveling stability of the vehicle by controlling a braking force of a wheel of the vehicle, a friction coefficient obtaining means for obtaining a friction coefficient of a road surface on which the vehicle travels, a lateral force reference value calculating means for calculating a lateral force reference value acting on the wheel on the basis of the friction coefficient of the road surface and a lateral force actual value obtaining means for obtaining a lateral force actual value acting on the wheel, wherein the controlling means controls the braking force on the basis of a comparison result between the lateral force reference value (Fyk) and the lateral force actual value.

BRIEF DESCRIPTION OF THE DRAWINGS

The foregoing and additional features and characteristics of the present invention will become more apparent from the following detailed description considered with the reference to the accompanying drawings, wherein:

FIG. 13 is a functional block diagram in a case where the slip restricting control is executed by means of a motion control device according to a sixth embodiment of the present invention.

DETAILED DESCRIPTION

Embodiments of a motion control device for a vehicle will be described below in accordance with the attached drawings. In the embodiments, symbols "**" are used to comprehensively indicate wheels in order to indicate a relationship with any one or more of four wheels. For example, "fl" indicates a relationship with a front-left wheel, "fr" indicates a relationship with a front-right wheel, "rl" indicates a relationship with a rear-left wheel and "rr" indicates a relationship with a rear-right wheel. Furthermore, symbols "f*" comprehensively indicate the front wheels in order to indicate a relationship with any one or more of the front wheels. Similarly, symbols "r*" comprehensively indicate the rear wheels in order to indicate a relationship with any one or more of the rear wheels. Symbols "*i" comprehensively indicate turning inner wheels. More specifically, the symbols "*i" indicate a relationship with any one or more of the turning inner wheels. Additionally, symbols "*o" comprehensively indicate turning outer wheels. More specifically, the symbols "*o" indicate a relationship with any one or more of the turning outer wheels. Furthermore, in the embodiments, a symbol "#" is used to comprehensively indicate front and rear wheel systems in order to indicate a relationship with either one or both of the front-wheel system and the rear wheel system. For example, "f" indicates a relationship with the front wheel system (i.e. relating to wheels of a front axle) and "r" indicates a relationship with the rear wheel system (i.e. relating to wheels of a rear axle).

First Embodiment

Figure 1:
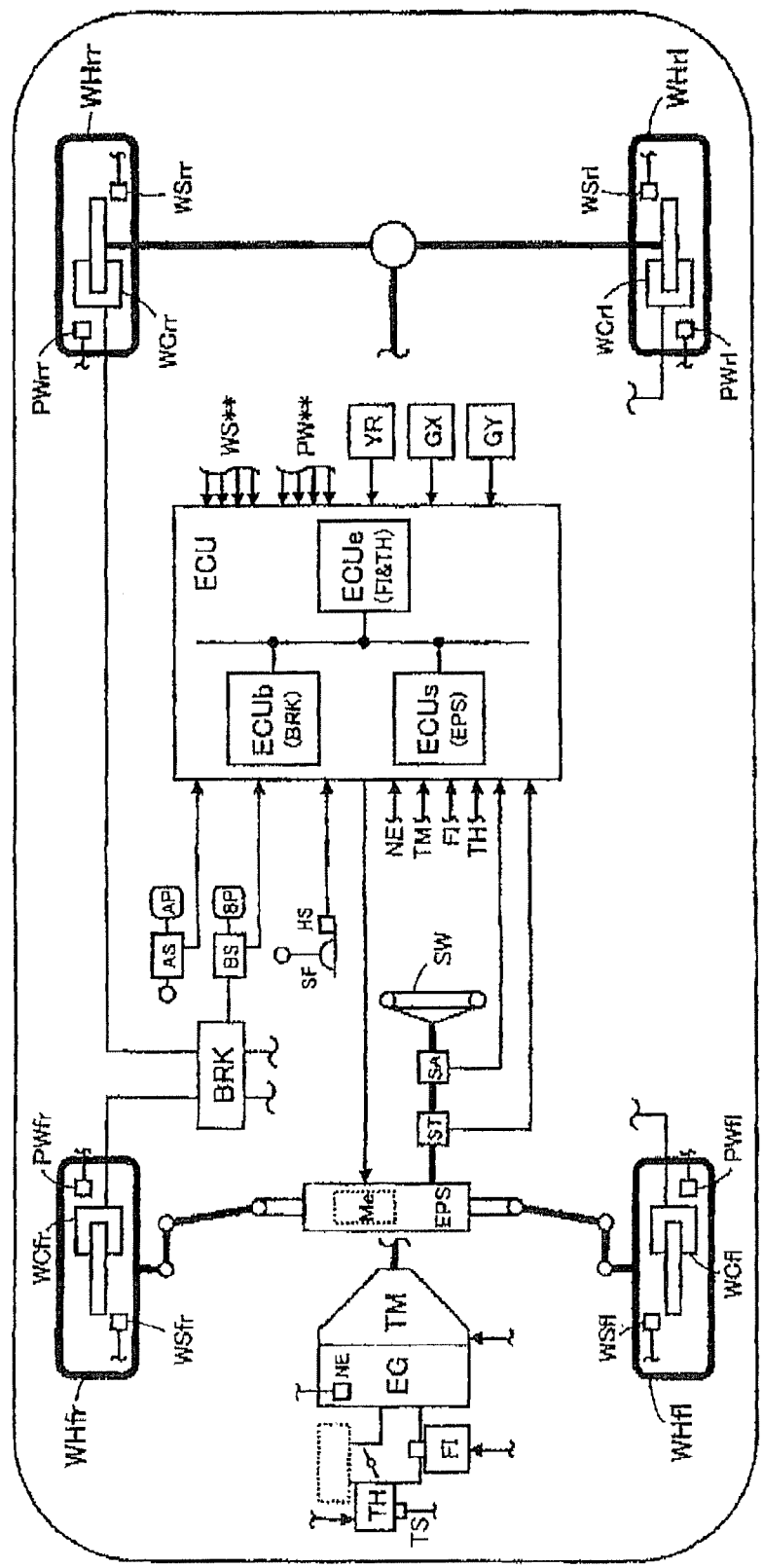
FIG. 1 is a schematic configuration of a vehicle to which a motion control device according to a first embodiment of the present invention is mounted.

Illustrated in FIG. 1 is a schematic configuration of the vehicle to which the motion control device (which will be hereinafter referred to as a device) according to the embodiments is provided. The device includes a wheel speed sensor WS (a wheel speed obtaining means) for detecting a wheel speed Vw, a steering wheel rotational angle sensor SA for detecting a rotational angle θsw of a steering wheel SW (from a neutral position), a steering torque sensor ST for detecting a torque Tsw generated when a driver operates the steering wheel SW, a yaw rate sensor YR for detecting a yaw rate Yr of a vehicle body, a longitudinal acceleration sensor GX for detecting an acceleration generated in a front-rear direction (a longitudinal direction) of the vehicle body (i.e. a longitudinal acceleration Gx), a lateral acceleration sensor GY for detecting an acceleration generated in a lateral direction of the vehicle body (i.e. a lateral acceleration Gy), a wheel cylinder pressure sensor PW for detecting a braking pressure Pw of a wheel cylinder WC**, an engine rotational speed sensor NE for detecting a rotational speed Ne of an engine EG, an accelerating operation amount sensor AS for detecting an operation amount As of an accelerating operation member AP, a braking operation amount sensor BS for detecting an operation amount Bs of a braking operation member BP, a shift position sensor HS for detecting a shift position Hs of a shift operation member SF, and a throttle position sensor TS for detecting an opening degree Ts of a throttle vale.

The device further Includes a brake actuator BRK for controlling the braking pressure, a throttle actuator TH for driving the throttle valve, a fuel injection actuator FI for injecting fuel, and an automatic transmission TM for controlling a gear shifting.

The device further includes an electronic control unit ECU. The electronic control unit ECU is a microcomputer configured by plural electronic control unites (ECUb, ECUe, ECUs), which are connected to one another by means of a communication bus and which are independent of each other. The electronic control unit ECU is electrically connected to each of the above-mentioned each actuators such as the brake actuator BRK and the like, and each of the above-mentioned sensors such as the wheel speed sensor WS** and the like. Each ECU, such as the ECUb and the like, within the electronic control unit ECU executes a specific control. As illustrated in, for example, FIG. 2, a sensor value and an internal calculation value of the EUC are obtained via the communication bus.

More specifically, the ECUb is a braking/driving force controlling unit for executing a slip restricting control such as an anti-skid control (ABS control), an electronic brake-force distribution control (EBD control), a traction control (TCS control) and the like, and a vehicle stabilizing control (an electronic stability control, ESC control) for restricting understeer and oversteer of the vehicle, on the basis of signals outputted from the wheel speed sensor WS**, the yaw rate sensor YR, the lateral acceleration sensor GY and the like. The ECUs is a power steering control unit for executing a known electric power steering control (an electric power assisted steering control) on the basis of a signal outputted from the steering torque sensor ST and the like. The EGUe is a power train system controlling unit for executing a control on the throttle actuator TH, the fuel injection actuator FI and a gear ratio of the automatic transmission TM on the basis of a signal outputted from the accelerating operation amount sensor AS and the like.

The brake actuator BRK has a know configuration in which plural electromagnetic valves, a hydraulic pump, an electric motor and the like are included. The brake actuator BRK supplies the braking pressure to the wheel cylinder WC of each wheel in response to an operation to the braking operation member BP by the driver while a brake control is not executed, so that a braking torque is applied to each wheel in response to the operation to the braking operation member BP. Further, the brake actuator BRK is configured to individually control the braking pressure within the wheel cylinder WC independently of the operation to the braking operation member BP while the brake control, such as the slip restricting control including the anti-skid control (the ABS control), the electronic brake-force distribution control (the EBD control), the traction control (the TCS control), the vehicle stabilizing control (the ESC control), or the like is executed, so that the braking torque is individually and separately modulated for each wheel. Additionally, modulation of the braking torque may be achieved by using an electric brake apparatus, instead of the braking pressure.

The vehicle stabilizing control (the ESC control) executed by the device of the first embodiment will be described below with reference to FIG. 2 in which a functional block diagram is illustrated. The vehicle stabilizing control is a control for maintaining a traveling stability of the vehicle on the basis of a turning motion state quantity of the vehicle (i.e. a control for stabilizing a turning state of the vehicle). At a steering characteristic related value calculating means A1 (a motion state quantity obtaining means), a value corresponding to a steering characteristic such as an understeer characteristic, an oversteer characteristic and the like of the vehicle (i.e. a steering characteristic corresponding value) is obtained via the sensors or the communication bus. The steering characteristic corresponding value is a value calculated on the basis of at least one of the yaw rate Yr, the lateral acceleration Gy, the steering wheel rotational angle θsw and a vehicle body slip angle β. The steering characteristic corresponding value corresponds to the turning motion state quantity.

At a vehicle target value calculating means A2, a target value for the entire vehicle for stabilizing the vehicle (i.e. a vehicle target value) is calculated on the basis of the steering characteristic corresponding value. More specifically, a target value of a yaw moment (i.e. a target moment Mq) to be applied to the vehicle for stabilizing the vehicle, and a deceleration (i.e. a target deceleration Gq) of the vehicle for stabilizing the vehicle are calculated at the vehicle target value calculating means A2.

The target yaw moment Mq is calculated on the basis of a relationship between a value calculated on the basis of the yaw rate Yr of the vehicle and a value calculated on the basis of the vehicle body slip angle β. The target deceleration Gq is calculated on the basis of a deviation ΔYr between the target value of the yaw rate Yr and an actual value of the yaw rate Yr. The target moment Mq and the target deceleration Gq are calculated to be values by which the vehicle is appropriately decelerated while maintaining an appropriate yawing behavior (the yaw rate Yr) of the vehicle.

At a wheel target value calculating means A3, a target value for each wheel (i.e. a wheel target value) for achieving the target moment Mq and the target deceleration Gq is calculated. A tire characteristic model may be used for calculating the wheel target value for the wheel WH in order to take a nonlinearity of each wheel (a pneumatic tire) into consideration. The wheel target value is calculated as a longitudinal force (a braking force) Fxs acting on each wheel.

The "calculation of the steering characteristic corresponding value", the "calculation of the vehicle target value" and the "calculation of the wheel target value" are execute by alternate known calculating methods, which are generally used at a vehicle stabilizing control device, other than the calculating method described above.

At a μ estimate calculating means A4 (a friction coefficient obtaining means), a friction coefficient μ (a road surface friction coefficient μ), generated between a road surface of a road, on which the vehicle travels, and the wheel WH, is calculated on the basis of information obtained via the communication bus. Further, at a slip angle calculating means A5 (a slip angle obtaining means), a slip angle α of the wheel WH is calculated on the basis of information obtained via the communication bus. At a vertical load calculating means A8 (a vertical load obtaining means), a vertical load Fz acting on the wheel WH** is calculated on the basis of information obtained via the communication bus.

Each of the road surface friction coefficient μ, the (wheel) slip angle α and the vertical load Fz is calculated by using a known calculation method. For example, the road surface friction coefficient μ may be calculated on the basis of the lateral acceleration Gy generated while the vehicle is turning. The (wheel) slip angle α may be calculated on the basis of the vehicle body slip angle β and the yaw rate Yr. Further, the vertical load Fz may be calculated on the basis of the longitudinal acceleration Gx and the lateral acceleration Gy.

Figure 3:
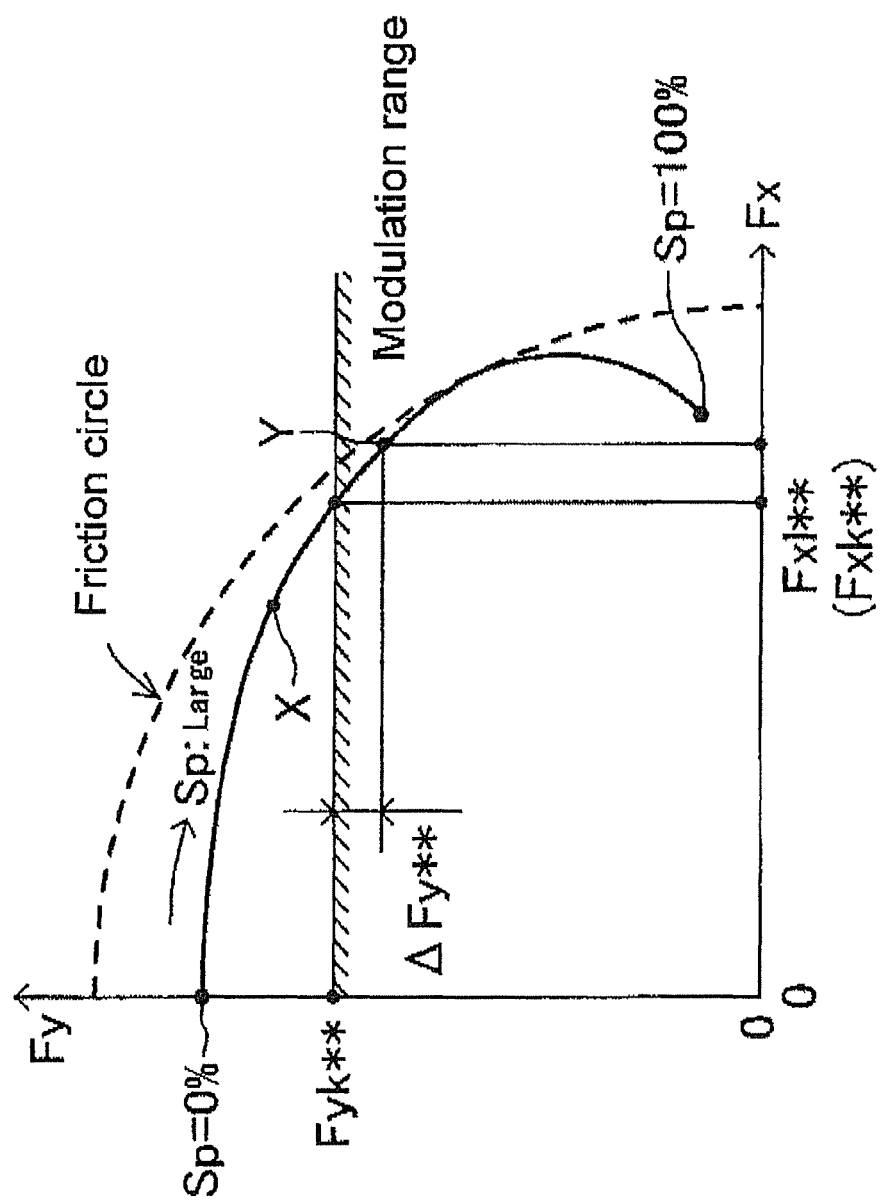
FIG. 3 is a graph for explaining advantages and effects of the device of the first embodiment.

At a lateral force reference value calculating means A7, a reference value Fyk of a lateral force generated at the wheel WH (the tire) (i.e. a lateral force reference value Fyk) is calculated on the basis of the road surface friction coefficient μ, the (wheel) slip angle α and the vertical load Fz. The lateral force reference value Fyk indicates a lateral force to be ensured in order to restrict an increase of a turning radius at the wheel WH. For example, the lateral force reference value Fyk is calculated to be a value existing within a "range in which a decreasing amount of a lateral force Fy is small relative to an increase of a longitudinal force Fx (a braking force Fx)", as illustrated in FIG. 3.

A force acting on the tire correlates with a value obtained by multiplying the road surface friction coefficient μ by the vertical load Fz (i.e. a radius of a friction circle). Therefore, the lateral force reference value Fyk is set on the basis of the value, which is obtained by multiplying the road surface friction coefficient μ by the vertical load Fz (μ·Fz) (i.e. the radius of the friction circle). Furthermore, the lateral force correlates with the slip angle α. Therefore, the greater the slip angle α is, the greater value the lateral force reference value Fyk** is set be.

In a case where the vehicle stabilizing control (the ESC control) is executed or in a case where the lateral force decreases, the wheel slip angle α is likely to reach a sufficiently great value and the lateral force is likely to be already saturated relative to an increase of the slip angle α. Therefore, in this case, an information relating to the slip angle α may be excluded from a calculation map for calculating the lateral force reference value Fyk. Further, it is when the road surface friction coefficient μ is small (e.g. in a case where the vehicle travels on a road surface covered with snow, ice and the like) that the vehicle stabilizing control is executed or a decrease of the lateral force becomes of concerns. In this case, less changes occur in the vertical load Fz. Therefore, in this case, an information relating to the vertical load Fz may be excluded from the calculation map for calculating the lateral force reference value Fyk. Accordingly, the lateral force reference value Fyk is calculated on the basis of at least the road surface friction coefficient μ.

At a lateral force actual value calculating means A8 (a lateral force actual value obtaining means), an actual value Fya of the lateral force generated at the wheel WH (i.e. a lateral force actual value Fya) is calculated on the basis of an information obtained via the communication bus. For example, as disclosed in JP2006-300086A, the lateral force actual value may be detected by using a rolling bearing unit, to which a load measuring apparatus is provided. Alternatively, as disclosed in JP2007-331659A, the lateral force actual value may be estimated by using a tire having a lateral force sensor. Further alternatively, as disclosed in JP2007-223390A, an actual value Fya# of a sum of the lateral forces may be calculated on the basis of the motion state quantity of the vehicle. According to JP2007-223390A, however, a method of estimating the lateral force actual value Fya of each wheel is not disclosed. The method of estimating the lateral force actual value Fya** of each wheel will be described later.

The lateral force actual value Fya is compared with the lateral force reference value Fyk. More specifically, a deviation ΔFy (a lateral force deviation ΔFy) between the lateral force actual value Fya and the lateral force reference value Fyk is calculated (i.e. ΔFy=Fya−Fyk**).

At an adjustment value calculating means A9, an adjustment value Gfs for adjusting the wheel target value Fxs is calculated on the basis of the lateral force deviation ΔFy. Accordingly, the wheel target value Fxs is adjusted by multiplying the wheel target value Fxs by the adjustment value Gfs.

More specifically, in a case where the deviation ΔFy is equal to or greater than zero (0) (i.e. in a case where the lateral force actual value Fya is equal to or greater than the lateral force reference value Fyk), the adjustment value Gfs is calculated to be one (1). Accordingly, an adjustment of the wheel target value Fxs is not executed. On the other hand, in a case where the deviation ΔFy is less than zero (0) (i.e. in a case where the lateral force actual value Fya is less than the lateral force reference value Fyk), the adjustment value Gfs is calculated to a value lower than one (1). Accordingly, the wheel target value Fxs is adjusted so as to be relatively small. More specifically, the smaller the deviation ΔFy (<zero (0)), the smaller value the wheel target value Fxs** is adjusted to be.

Additionally, on a calculation map for calculating the adjustment value Gfs, a lower limit value Gs1 (which is set to be a positive value smaller than one (1)) of the adjustment value Gfs is set. Accordingly, the wheel target value Fxs** is prevented from being adjusted to be an excessively smaller value.

A final wheel target value Fxt, which is obtained by adjusting the wheel target value Fxs with the adjustment value Gfs** as above, corresponds to "a target value of a braking force corresponding value". In other words, the "target value of the braking force corresponding value", which is calculated on the basis of the "motion state quantity", is adjusted on the basis of a comparison result between the "lateral force reference value" and the "lateral force actual value".

At a braking torque modulating means A10, a driving means of the brake actuator BRK (a braking apparatus) (e.g. an electric motor for the hydraulic pump, a driving means of a solenoid valve and the like) is controlled on the basis of the final wheel target value Fxt. By providing a sensor for detecting a baking force actual value relative to the final wheel target value Fxt at each wheel, the driving means is controlled so as to correspond the braking force actual value Fxa to the final wheel target value Fxt on the basis of the final target value Fxt and the actual value Fxa.

The braking force actual value Fxa is calculated on the basis of one of know methods, by using the detection result Pw (the braking pressure Pw) of the braking pressure sensor PW, the wheel speed Vw and the like. More specifically, the braking force actual value Fxa may be calculated from, for example, the braking torque, which is applied to the wheel WH and which is obtained from the braking pressure Pw generated within the wheel cylinder WC, an angular acceleration, which is generated at the wheel WH and which is a derivative value of the wheel speed Vw, an equation of a rotational motion of the wheel WH and the like. The device may be modified so as not to include the braking pressure sensor PW at the wheel cylinder WC. In this case, the braking force actual value Fxa** may be estimated on the basis of an actuation state of the hydraulic pump, the electric motor, the electromagnetic valves and the like, which configure the brake actuator BRK.

In the first embodiment, the adjustment value Gfs is calculated on the basis of the deviation ΔFy of the lateral force. Then, the wheel target value Fx (Fxt) is adjusted (reduced) on the basis of the adjustment value Gfs. The wheel target value Fxs (Fxt) is reduced on the basis of a sign of the lateral force deviation ΔFy (i.e. on the basis of whether or not the actual value Fya of the lateral force is greater than the reference value Fyk of the lateral force).

Advantages and effects of the device of the first embodiment will be described below with reference to FIG. 3. As is the case with FIG. 14, in FIG. 3, a solid line indicates a Fx-Fy characteristic of the tire, In which a slip ratio Sp is used as a parameter, in a case where the wheel slip angle α is constant at a specific value. A dashed line indicates a friction circle of the tire. The lateral force reference value Fyk in FIG. 3 is the value within the "range in which the decreasing amount of the lateral force Fy is small relative to the increase of the longitudinal force Fx (the braking force Fx)". Further, the lateral force reference value Fyk** is a value to be ensured in order to restrict the increase of the turning radius.

For example, in a case where a relationship between the longitudinal force Fx (the braking force Fx) and the lateral force Fy corresponds to a relationship indicated by a point X while the lateral force reference value Fyk is set to be the value in the range in which the decreasing amount of the lateral force Fy is small relative to the longitudinal force Fx (the braking force Fx), the braking force actual value Fya is greater than the lateral force reference value Fyk (i.e. Fya>Fyk), therefore, the deviation ΔFy (=Fya−Fyk) becomes greater than zero (0) (i.e. ΔFy>0). Accordingly, the adjustment value Gfs is calculated to be one (1), therefore, the final wheel target value Fxt is not adjusted. Accordingly, in the case where the lateral force to be ensured in order to restrict the increase of the turning radius has already been ensured, the braking force is not adjusted on the basis of the deviation ΔFy.

On the other hand, in a case where the relationship between the longitudinal force Fx (the braking force Fx) and the lateral force Fy corresponds to a relationship indicated by a point Y, the braking force actual value Fya is smaller than the lateral force reference value Fyk (i.e. Fya<Fyk) (i.e. a range in which the decreasing amount of the lateral force Fy is great relative to the increase of the longitudinal force Fx (the braking force Fx), and which corresponds to a range in which the actual value Fya needs to be modulated (a modulation range)), therefore, the deviation ΔFy becomes less than zero (0) (i.e. ΔFy<0) as illustrated in FIG. 3. Accordingly, the adjustment value Gfs is calculated to be a value smaller than one (1) (i.e. Gfs<1), therefore, the final wheel target value Fxt is adjusted to be a smaller value. In other words, in a case where the lateral force to be ensured in order to restrict the increase of the turning radius is not ensured, the braking force is modulated so as to decrease in response to the deviation ΔFy** (<0). As a result, the slip ratio decreases while the lateral force increases, thereby ensuring a vehicle stability and restricting the increase of the turning radius of the vehicle.

An output of a vehicle behavior (e.g. the yaw rate Yr) relative to an input of the vehicle behavior (e.g. the yaw moment) is executed with time delay. The lower the road surface friction coefficient μ becomes, the more significant such time delay becomes. Further, in a case where the road surface friction coefficient μ is low, the wheel target value (the target value of the braking force corresponding value), by which the vehicle target value (e.g. the target moment Mq and the like) is achieved, may not exist because of a limit of a road surface friction. In this case, the wheel target value is generally calculated to a maximum value, which may result in increasing the braking force and lacking the lateral force to be generated at the wheel WH**.

Considered below is a case where a turning direction of the vehicle is changed from one direction to the other direction while the wheel target value is maintained to be at the maximum value and the lateral force at the wheel is insufficient due to the above-mentioned reasons while the vehicle is turning in the one direction. In this case, due to the above-mentioned time delay, more specifically, because an application of the braking force based on the wheel target value while the vehicle is turning in the one direction influences the vehicle behavior of when the vehicle is turning in the other direction, a so-called sway may occur at the vehicle. On the other hand, in the first embodiment, the actual value Fya of the lateral force is obtained, so that the wheel target value Fxs is adjusted so as to ensure a sufficient lateral force at the wheel WH on the basis of the comparison result between the lateral force actual value Fya and the lateral force reference value Fyk**. As a result, an occurrence of the sway may be restricted.

Second Embodiment

A motion control device according to a second embodiment will be described below. In the first embodiment, the final wheel target value Fxt is calculated by adjusting the wheel target value Fxs on the basis of the deviation ΔFy between the lateral force reference value Fyk (see FIG. 3) and the lateral force actual value Fya (ΔFy=Fya−Fya). On the other hand, in the second embodiment, a braking force reference value Fxk is calculated (see FIG. 3). Then, a braking force reference value Fxl is newly calculated by adjusting the braking force reference value Fxk on the basis of the deviation ΔFy. The final wheel target value Fxt is selectively calculated by comparing the braking force reference value Fxl with the wheel target value Fxs**.

Figure 4:
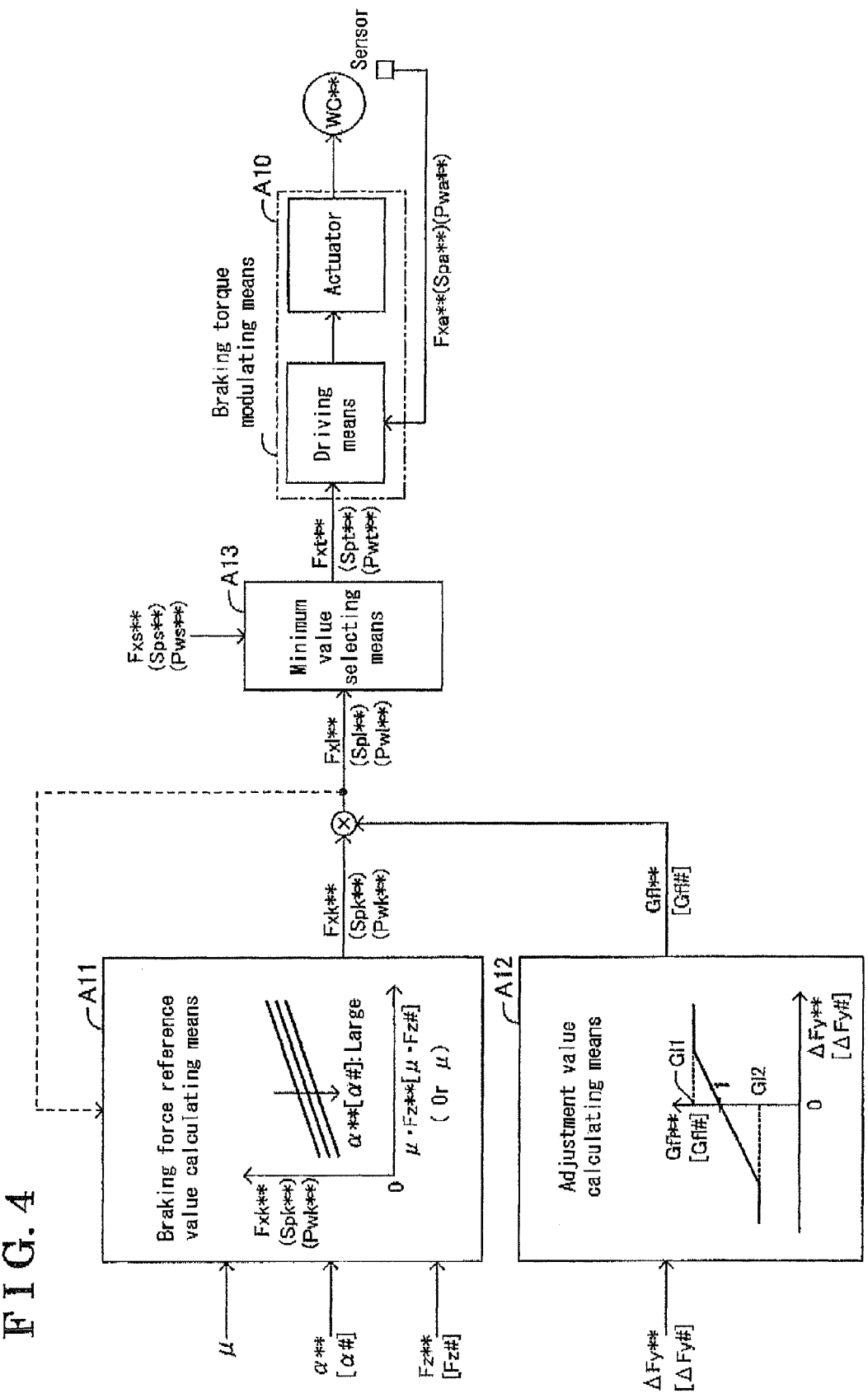
FIG. 4 is a functional block diagram in a case where the vehicle stabilizing control is executed by means of a motion control device according to a second embodiment of the present invention.

More specifically, as illustrated in a functional block diagram of FIG. 4, the device of the second embodiment further includes a braking force reference value calculating means A11, an adjustment value calculating means A12 and a minimum value selecting means A13 in addition to the means of the first embodiment, on the premise that the deviation ΔFy and the wheel target value Fxs, which are used in the first embodiment, are also used in the second embodiment.

At the braking force reference value calculating means A11, the reference value Fxk of the longitudinal force (the braking force) generated at the wheel WH (the tire) (i.e. the braking force reference value Fxk) is calculated on the basis of the road surface friction coefficient μ, the (wheel) slip angle α and the vertical load Fz. The braking force reference value Fxk is a braking force for achieving the lateral force reference value Fyk at the wheel WH. Furthermore, the braking force reference value Fxk is a braking force corresponding to the lateral force reference value Fyk in the Fx–Fy characteristic, as illustrated in FIG. 3.

As described above, the force acting on the tire correlates with the value obtained by multiplying the road surface friction coefficient μ by the vertical load Fz (i.e. the radius of the friction circle). Therefore, the braking force reference value Fxk is set on the basis of the value obtained by multiplying the road surface friction coefficient μ by the vertical load Fz (i.e. value=μ·Fz) (the radius of the friction circle). Furthermore, the braking force correlates with the slip angle α. Therefore, the greater the slip angle α is, the smaller value the braking force reference value Fxk** is set to be.

In the case where the vehicle stabilizing control (the ESC control) is executed, the wheel slip angle α is likely to reach the sufficiently great value. Therefore, in the case where the vehicle stabilizing control (the ESC control) is executed, the information relating to the slip angle α may be excluded from a calculation map for calculating the braking force reference value Fxk. Further, in the case where the vehicle stabilizing control is execute, it is when the road surface friction coefficient μ is small (e.g. in the case where the vehicle travels on the road surface covered with snow, ice and the like) that the decrease of the lateral force becomes of concerns. In this case, less changes is likely to occur in the vertical load Fz. Therefore, in this case, the information relating to the vertical load Fz may be excluded from the calculation map for calculating the braking force reference value Fxk. Accordingly, the braking force reference value Fxk** is calculated on the basis of at least the road surface friction coefficient μ.

At the adjustment value calculating means A12, an adjustment value Gfl for adjusting the braking force reference value Fxk is calculated on the basis of the deviation ΔFy (=Fya−Fy). Normally, the calculation map for calculating the braking force reference value Fxk may include an error. Therefore, the braking force reference value Fxk is adjusted by the adjustment value Gfl, which is calculated by using the deviation ΔFy based on the lateral force actual value Fya, so as to correct (compensate) the error.

More specifically, in the case where the deviation ΔFy is equal to or greater than zero (0) (i.e. Fya≧Fyk), the adjustment value Gfl is calculated to be a value equal to or greater than one (1). Then, the braking force reference value Fxk is multiplied by the adjustment value Gfl, so that the braking force reference value Fxk is adjusted so as to increase. On the other hand, in the case where the deviation ΔFy is less than zero (0) (i.e. Fya<Fyk), the adjustment value Gfl is calculated to be a value less than one (1), so that the braking force reference value Fxk is adjusted so as to decrease. Additionally, in order to prevent the braking force reference value Fxk from being excessively adjusted, an upper limit value Gl1 (which is a predetermined value greater than one (1)) and a lower limit value Gl2 (which is a predetermined value less than one (1)) are set on a calculation map for calculating the adjustment value Gfl.

The value Fxl, obtained by multiplying the braking force reference value Fxk by the adjustment value Gfl, is used as the braking force reference value from the next calculation cycle. Then, the braking force reference value Fxl gradually converges towards a value for approximating the deviation ΔFy to zero (0). In other words, the braking force reference value Fxl is adjusted to the value of the braking force to be applied in order to correspond the lateral force actual value Fya to the lateral force reference value Fyk.

At the minimum value selecting means A13, the braking force reference value Fxl is compared with the wheel target value Fxs, so that the final wheel target value Fxt to be outputted to the braking torque modulating means A10 is calculated to the smaller value. In other words, the wheel target value Fxs (Fxt) is controlled so as not to exceed the braking force reference value Fxl. Accordingly, the lateral force actual value Fya is prevented from falling below the lateral force reference value Fyk, which occurs when the braking force exceeds the braking force reference value Fxl. As a result, as is the case with the first embodiment, the lateral force to be ensured at the wheel WH in order to restrict the increase of the turning radius of the vehicle is ensured.

In the second embodiment, the adjustment value Gfl is calculated on the basis of the deviation ΔFy of the lateral force, so that the braking force reference value Fxk (Fxl) is adjusted on the basis of the adjustment value Gfl. The braking force reference value Fxk is increased/decreased on the basis of the sign of the lateral force deviation ΔFy (i.e. on the basis of whether or not the actual value Fya of the lateral force is greater than the reference value Fyk** of the lateral force).

Advantages and effects of the device according to the second embodiment will be described below with reference to FIG. 3. In the second embodiment, the braking force reference value Fxk (Fxl) is sequentially updated/adjusted so as to approximate the deviation ΔFy of the lateral force to zero (0). As a result, the actual lateral force Fya approximates to the lateral force reference value Fyk. Then, the braking force is restricted so as not to exceed the braking force reference value Fxk (Fxl**). Accordingly, as is the case with the first embodiment, the braking force is modulated so as to decrease (i.e. the braking force is modulated so as to increase the lateral force) in the case where the lateral force is insufficient, therefore, the increase of the turning radius of the vehicle is restricted while ensuring the vehicle stability.

Additionally, in the second embodiment, a speed of the increase of the braking force during a braking force control may be increased by limiting the braking force so as to be equal to or less than the braking force reference value Fxk (Fxl). Generally, once the slip ratio exceeds a value corresponding to a peak value of the road surface friction coefficient μ (a road surface friction force) in an increasing process of the braking force to be applied to the wheel WH (i.e. an increasing process of the slip ratio of the wheel WH), the road surface friction coefficient μ (the road surface friction force) rapidly decreases, which results in rapidly causing a lock tendency at the wheel WH. In order to restrict the rapid lock tendency, generally, the braking force needs to be gradually increased to some extent in the braking force control. On the other hand, in the second embodiment, because the braking force reference value Fxk (Fxl) is set, the braking force may be immediately increased up to the braking force reference value Fxk (Fxl**). As a result, the vehicle stability during the braking force control is further enhanced.

Third Embodiment

A motion control device according to a third embodiment will be described below. The device of the third embodiment differs from the device of the second embodiment in a calculating method for calculating the braking force reference value Fxk**. Hence, only the differences between the device of the second embodiment and the device of the third embodiment will be described below.

Figure 5:
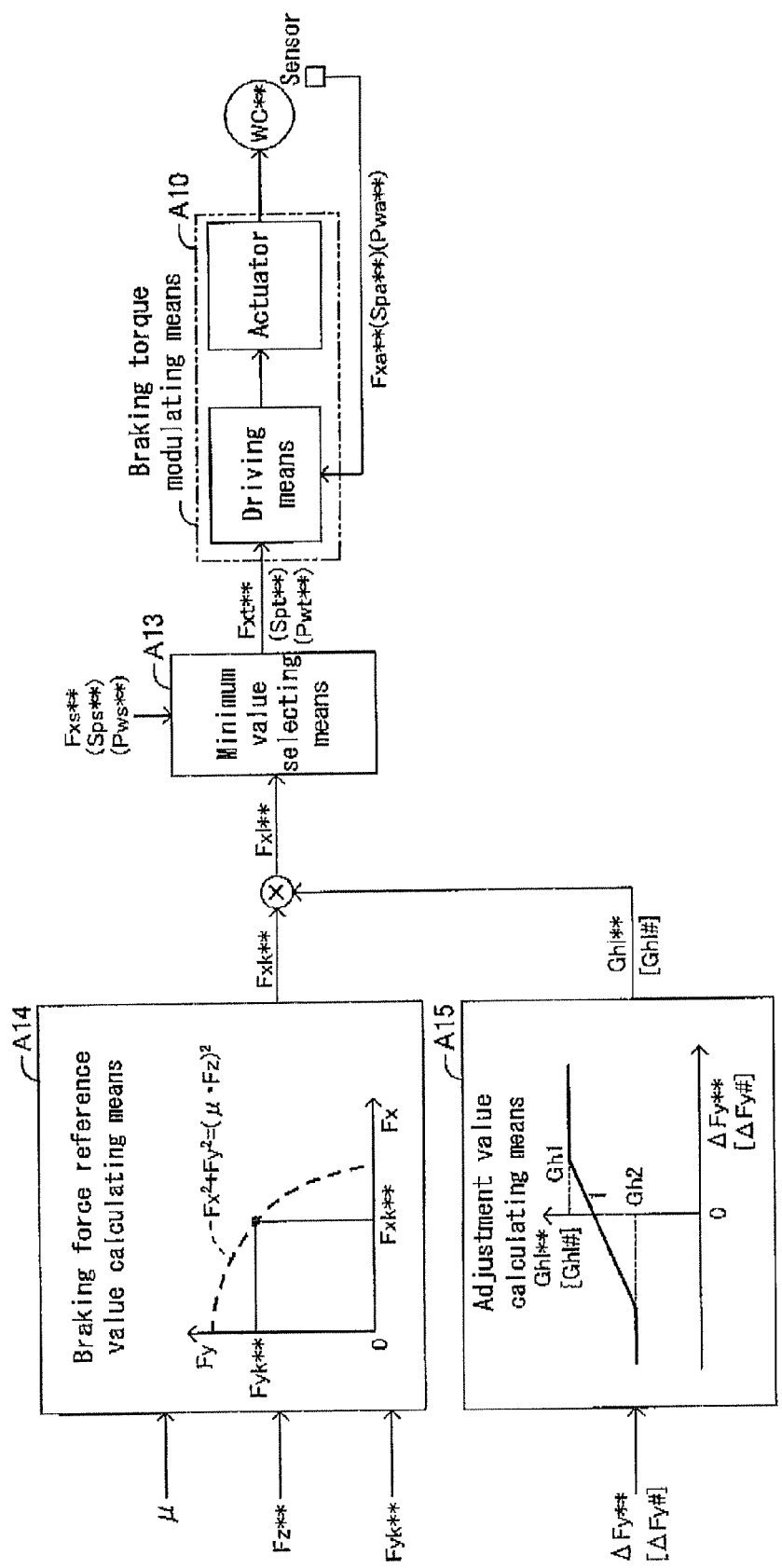
FIG. 5 is a functional block diagram in a case where the vehicle stabilizing control is executed by means of a motion control device according to a third embodiment of the present invention.

As illustrated in a functional block diagram in FIG. 5, the device of the third embodiment includes a similar configuration as the device in the second embodiment except that the device of the third embodiment includes a braking force reference value calculating means A14, which replaces the braking force reference value calculating means A11 in the second embodiment, and an adjustment value calculating means A15, which replaces the adjustment value calculating means A12 in the second embodiment.

At the braking force reference value calculating means A14, a braking force corresponding to the lateral force reference value Fyk is calculated on the basis of the following equation (Equation 2) by using an equation of the friction circle of the tire, which is indicated by Equation 1 and which is obtained on the basis of the road surface friction coefficient μ and the vertical load Fz. The calculated braking force is used as the braking force reference value Fxk**.

$$Fx^{2} + Fy^{2} = (\mu \cdot Fz^{**})^2 \qquad \text{Equation 1}$$

$$Fxk^{} = \sqrt{\{(\mu \cdot Fz^{})^2 - Fyk^{**2}\}} \qquad \text{Equation 2}$$

At the adjustment value calculating means A15, as is the case with the adjustment value calculating means A12 in the second embodiment, an adjustment value Ghl is calculated on the basis of the deviation ΔFy. Then, the braking force reference value Fxk is adjusted on the basis of the adjustment value Ghl. Accordingly, as is the case with the second embodiment, the braking force reference value Fxl is adjusted to the value of the braking force to be applied in order to correspond the lateral force actual value Fya to the lateral force reference value Fyk**.

(Estimation of Lateral Force Actual Value of Each Wheel)

Figure 2:
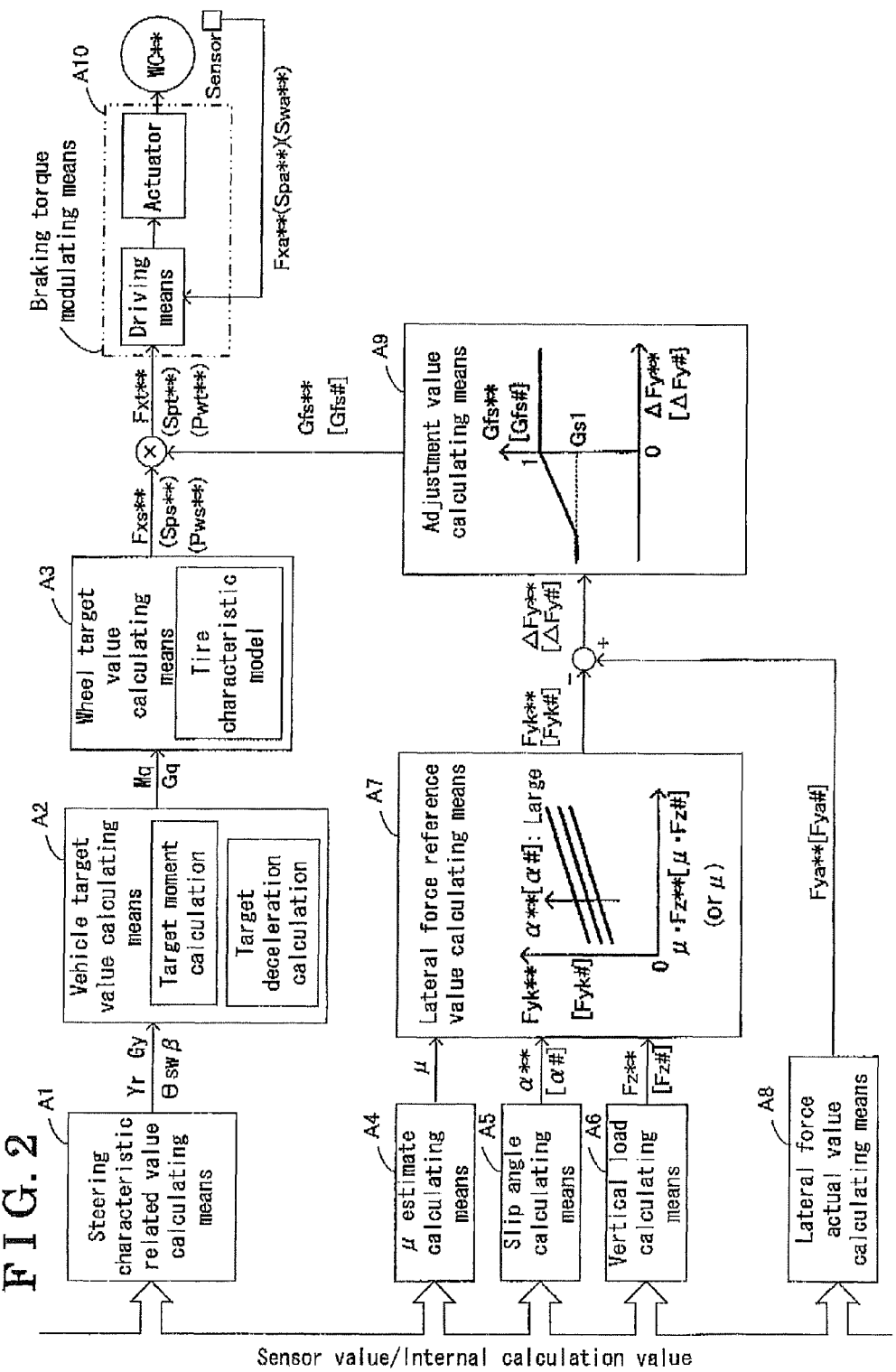
FIG. 2 is a functional block diagram in a case where a vehicle stabilizing control is executed by means of the motion control device indicated in FIG. 1.

An estimating method of estimating the lateral force actual value Fya for each wheel WH by the lateral force actual value calculating means A8, which is illustrated in FIG. 2, will be described.

<First Estimating Method>

Figure 6:
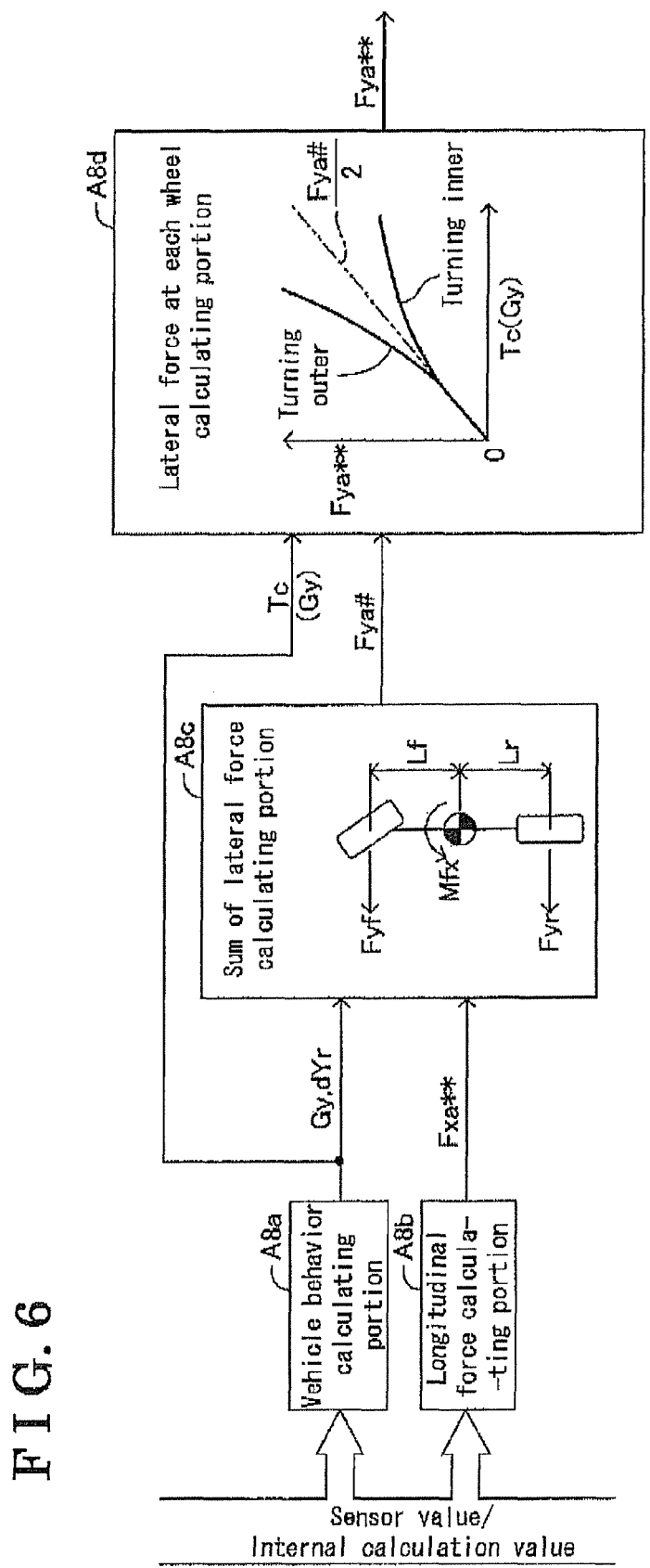
FIG. 6 is a functional block diagram related to a first estimating method for estimating a lateral force actual value of each wheel executed by the lateral force actual value calculating means indicated in FIG. 2.

A first estimating method executed by the lateral force actual value calculating means A8 will be described below with reference to FIG. 6. Firstly, at a vehicle behavior calculating portion A8a (a vehicle turning behavior obtaining means), the lateral acceleration Gy and the yaw rate Yr are obtained via the communication bus. A yaw angular acceleration dYr is calculated by differentiating the yaw rate Yr by time. Additionally, the actual value Fxa** of the longitudinal force (the braking force) generated at each wheel is obtained (calculated) at a longitudinal force calculating portion A8b (a braking force actual value obtaining means).

Secondly, an actual value Fya# of a sum of the lateral forces generated at the front wheels and the rear wheels is calculated on the basis of the following equation (Equation 3) at a sum of lateral force calculating portion A8c.

$$Fyf + Fyr = m \cdot Gy \qquad \text{Equation 3}$$

$$(Fyf \cdot Lf) - (Fyr \cdot Lr) + Mfx = Iz \cdot dYr$$

In Equation 3, "Fyf" indicates the sum of the lateral forces generated at the front wheels (i.e. Fyf=Fyfl+Fyfr), "Fyr" indicates the sum of the lateral forces generated at the rear wheels (i.e. Fyr=Fyrl+Fyrr), "m" indicates a mass of the vehicle, "Gy" indicates the lateral acceleration, "Lf" indicates a distance from the front axis to a center of vehicle gravity, "Lr" indicates a distance from the rear axis to the center of vehicle gravity, "Mfx" indicates the yaw moment generated due to a difference between the longitudinal forces (the braking forces) generated between the right and left wheels (i.e. a difference between a right-wheel longitudinal force and a left-wheel longitudinal force), "Iz" indicates an inertial moment relating to a yaw motion of the vehicle, and "dYr" indicates the yaw angular acceleration. The yaw moment Mfx is calculated from the following equation (Equation 4). In Equation 4, "Tf" indicates a front wheel tread and "Tr" indicates a rear wheel tread.

$$Mfx = (Tf/2) \cdot (Fxfl - Fxfr) + (Tr/2) \cdot (Fxrl - Fxrr) \qquad \text{Equation 4}$$

In the vehicle stabilizing control, the yaw moment is controlled also by the difference between the right-wheel braking force (the right-wheel longitudinal force) and the left-wheel braking force (the left-wheel longitudinal force), in addition to the lateral force generated at the wheel WH**. From this perspective, the actual value Fya# of the sum of the lateral forces is calculated also in consideration of the yaw moment Mfx, which is generated in response to the braking force, in an equation of a vehicle motion state.

Thirdly, at a lateral force at each wheel calculating portion A8d, the actual value Fya# of the sum of the lateral forces (the sum of the lateral forces generated at the right wheels and the left wheels) is divided into the wheel lateral force actual value Fya of the right wheel and the lateral force actual value Fya of the left wheel on the basis of a turning state quantity Tc. The lateral acceleration Gy may be used as the turning state quantity Tc.

The changes in the vertical load Fz in response to a turning motion of the vehicle (a load shift), changes in geometry of a suspension and the like influence the lateral force actual value Fya. Therefore, the lateral force actual value Fya** of each wheel is calculated from the sum (the actual value) Fya# of the lateral forces generated at the front wheels and the rear wheels on the basis of he turning state quantity Tc, on which the above-mentioned influences are reflected.

Furthermore, in the case where the road surface friction coefficient μ is low, the load shift occurring due to the turning motion of the vehicle is small and a suspension stroke is also little. Therefore, in a case where the road surface friction coefficient μ is equal to or lower than a predetermined value (e.g. in the case where the vehicle travels on the road surface covered with snow, ice and the like), the lateral force actual value Fya** at each wheel may be calculated to be half the value of the corresponding sum Fya# of the lateral forces (i.e. Fya#/2).

<Second Estimating Method>

Figure 7:
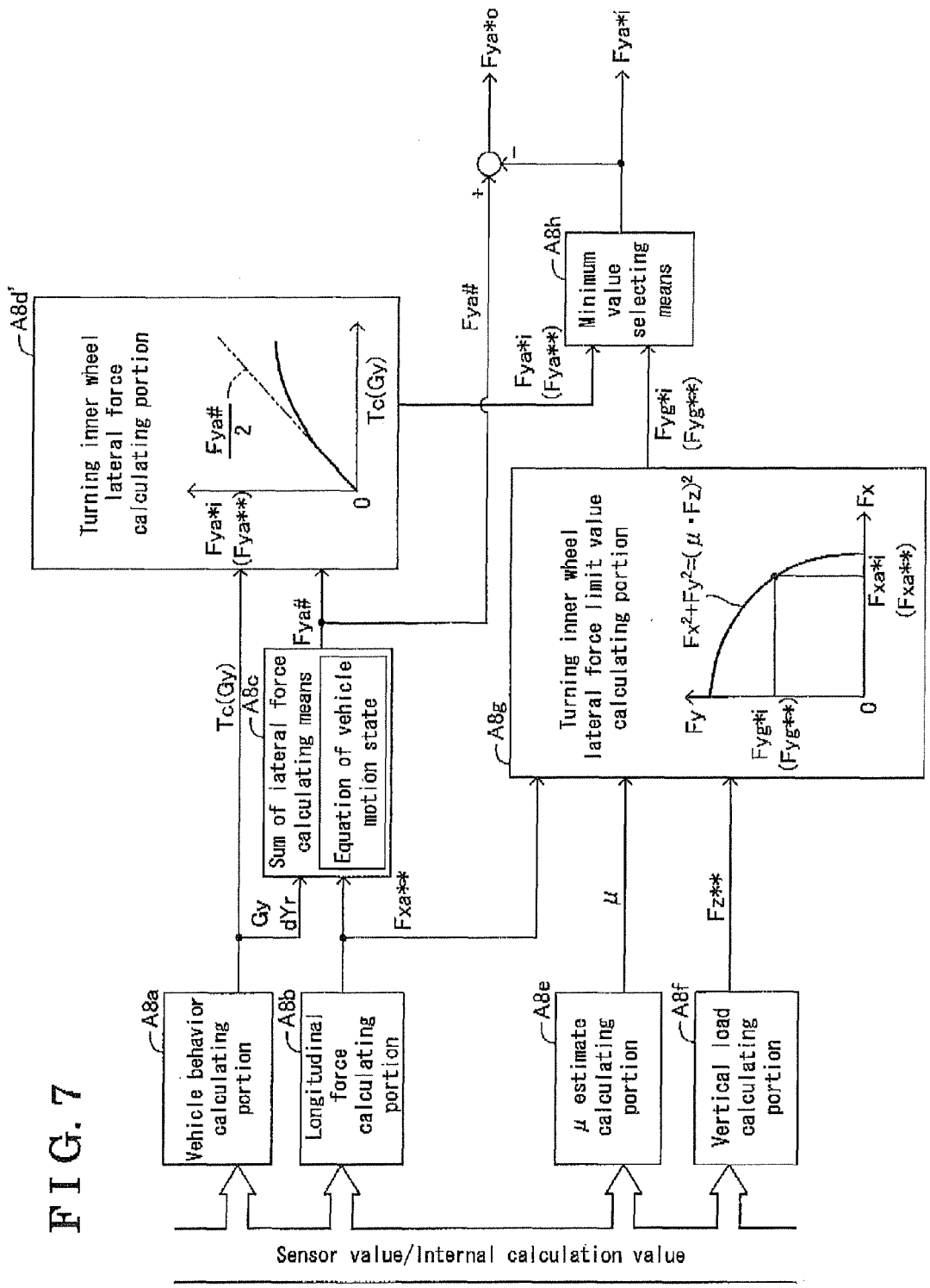
FIG. 7 is a functional block diagram related to a second estimating method for estimating the lateral force actual value of each wheel executed by the lateral force actual value calculating means indicated in FIG. 2.

A second estimating method executed by the lateral force actual value calculating means A8 will be described with reference to FIG. 7. The force (the lateral force) exceeding a range of the tire friction circle, which is determined on the basis of the road surface friction coefficient μ and the vertical load Fz, is not generated at the tire. In the case where the actual value Fya# of the sum of the lateral forces is divided into the lateral force actual value Fya of each wheel as described above, a force corresponding to a friction limit of the tire (the friction circle) may have already been generated at the wheel. Therefore, an upper limit value of the lateral force, which corresponds to the tire friction circle, is provided, which may result in further enhancing the calculation of the lateral force actual value Fya. Hereinbelow, in order to facilitate the explanation of the second estimating method, the symbols "*i" indicate at least one of the turning inner wheels and the symbols "*o" indicate at least one of the turning outer wheels.

The wheel, at which the vertical load Fz** is decreasing, is likely to reach the friction limit of the tire. A braking force actual value Fxa*i according to the turning inner wheel is inputted into a turning inner wheel lateral force limit value calculating portion A8g from the longitudinal force calculating portion A8b. Furthermore, the road surface friction coefficient μ and the vertical load Fz*i generated at the turning inner wheel are inputted into the turning inner wheel lateral force limit value calculating portion A8g from a μ estimate calculating portion A8e and a vertical load calculating portion A8f, respectively. A lateral force limit value Fyg*i is calculated from the following equation (Equation 5) on the basis of the above-described inputted values and the equation of the friction circle of the tire (see Equation 1).

$$Fyg\text{*}i = \sqrt{\{(\mu \cdot Fz\text{*}i)^2 - Fxa\text{*}i^2\}} \qquad \text{Equation 5}$$

Then, at a minimum value selecting means A8h, the above-mentioned lateral force limit value Fyg*i is compared with the lateral force actual value Fya*i, which is calculated on the basis of the actual value Fya# of the sum of the lateral forces and the turning state quantity Tc (Gy) at a turning inner wheel lateral force calculating portion A8d' corresponding to a portion relating to the turning inner wheel in the lateral force at each wheel calculating portion A8d. As a result of the comparison, either the lateral force limit value Fgy*i or the lateral force actual value Fya*i having a smaller absolute value is adapted as the lateral force actual value Fya*i. In other words, a limitation is executed to the lateral force actual value Fya*i by using the tire friction circle so that the lateral force actual value Fya*i does not exceed the lateral force limit value Fyg*i.

A lateral force actual value Fya*o of the turning outer wheel is calculated by subtracting the lateral force actual value Fya*i of the turning inner wheel from the actual value Fya# of the sum of the lateral forces.

The influence of the vertical load Fz** is taken into account at the turning inner wheel lateral force limit value calculating portion A8g, as described above. Therefore, the lateral force actual value Fya*i may be calculated to be half the value of the actual value Fya# of the sum of the lateral forces (Fya*i=Fya#/2) at the turning inner wheel lateral force calculating portion A8d' without considering the turning state quantity Tc (Gy). Then, the lateral force limit value Fyg*i is compared with the lateral force actual value Fya*i (=half the value of the actual value Fya# of the sum of the lateral forces) at the minimum value selecting means A8h, so that either the lateral force limit value Fyg*i or the lateral force actual value Fya*i having the smaller absolute value is adapted as the lateral force actual value Fya*i. In other words, in a case where half the value of the actual value Fya# of the sum of the lateral force is smaller than the lateral force limit value Fyg*i, the lateral force actual value Fya*i is calculated to be half the value of the actual value Fya# of the sum of the lateral forces. On the other hand, in a case where half the value of the actual value Fya# of the sum of the lateral forces is equal to or greater than the lateral force limit value Fyg*i, the lateral force actual value Fya*i is calculated to the lateral force limit value Fyg*i.

A case where the braking force is not applied to the turning inner wheel and the braking force, corresponding to the tire friction limit, is applied to the turning outer wheel may occur while the vehicle stabilizing control is being executed. Furthermore, a case where the turning outer wheel does not reach the tire friction limit but the turning inner wheel reaches the tire friction limit may occur. In order to handle the above-described cases, the following method may be adapted. In this case, it is assumed that the "lateral force limit value Fyg*i" of the turning inner wheel is replaced with the "lateral force limit value Fyg**" of each wheel, the "lateral force actual value Fya*i" of the turning inner wheel is replaced with the "lateral force actual value Fya**" of each wheel, and the "braking force actual value Fxa*i" of the turning inner wheel is replaced with the "braking force actual value Fxa**" of each wheel in FIG. 7.

The lateral force limit value Fyg** of each wheel is set by a similar method as the method of setting the lateral force limit value Fyg*i. An absolute value of the lateral force limit value Fyg of the right wheel is compared with an absolute value of the lateral force limit value Fyg of the left wheel.

Either one of the lateral force limit values Fyg of the right and left wheels, whose absolute value is the smaller, is compared with an absolute value of the corresponding lateral force actual value Fya, which is calculated from the actual value Fya# of the sum of the lateral forces and the turning state quantity Tc (Gy). Then, either one of the lateral force limit value Fyg and the lateral force actual value Fya, having the smaller absolute value, is adapted as the lateral force actual value Fya**, so that the lateral force limit value of the wheel, which reaches the tire friction limit earlier between the right and left wheels, is set as the lateral force actual value of the wheel having the smaller absolute value. The lateral force actual value of the other wheel, which has not yet reached the friction limit, will be obtained by subtracting the lateral force actual value of the wheel, which has reached the friction limit, from the actual value of the sum of the lateral forces.

In the calculation of the lateral force limit value Fyg of each wheel, the influence of the vertical load Fz is taken into consideration. Therefore, the lateral force actual value Fya, which is calculated from the actual value Fya# of the sum of the lateral forces, may be calculated to be half the value of the actual value Fya# of the sum of the lateral forces. Then, at the minimum value selecting means A8h, the lateral force limit value Fyg (the lateral force limit value Fyg of the wheel having the smaller absolute value of the lateral force limit value Fya between the right and left wheels) is compared with the lateral force actual value Fya (=half the value of the actual value Fya# of the sum of the lateral forces), so that either one of the lateral force limit value Fyg and the lateral force actual value Fya having the smaller absolute value is adapted as the lateral force actual value Fya. More specifically, in a case where half the value of the actual value Fya# of the sum of the lateral forces is less than the lateral force limit value Fyg, the lateral force actual value Fya is calculated to be half the value of the actual value Fya# of the sum of the lateral forces. On the other hand, in a case where half the value of the actual value Fya# of the sum of the lateral forces is equal to or greater than the lateral force limit value Fyg, the lateral force actual value Fya is calculated to the lateral force limit value Fyg**. Described above is the method of estimating the lateral force actual value of each wheel by the lateral force actual value calculating means A8.

The present invention is not limited to the above-described embodiments, but various modifications and changes may be adapted by others, and equivalents may be employed, without departing from the spirit of the present invention. For example, by using a fact that the braking force closely relates to a longitudinal slip of the wheel (a braking slip, the slip ratio and the like), braking slip target values Sps, Spt may be used as the target values of the braking force corresponding value instead of the wheel target values Fxs, Fxt (the braking force target values Fxs, Fxt), braking slip reference values Spk, Spl may be used as the reference values of the braking force corresponding value instead of the braking value reference values Fxk, Fxl, and a braking slip actual value Spa may be used as the actual value of the braking force corresponding value instead of the braking force actual value Fxa in the first and second embodiments.

Similarly, in the device using the braking pressure, a braking pressure target values Pws, Pwt may be used as the target values of the braking force corresponding value instead of the braking force target values Fxs, Fxt, braking pressure reference values Pwk, Pwl may be used as the reference values of the braking force corresponding value instead of the braking force reference values Fxk, Fxl, and a braking pressure actual value Pwa may be used as the actual value of the braking force corresponding value instead of the braking force actual value Fxa.

Figure 8:
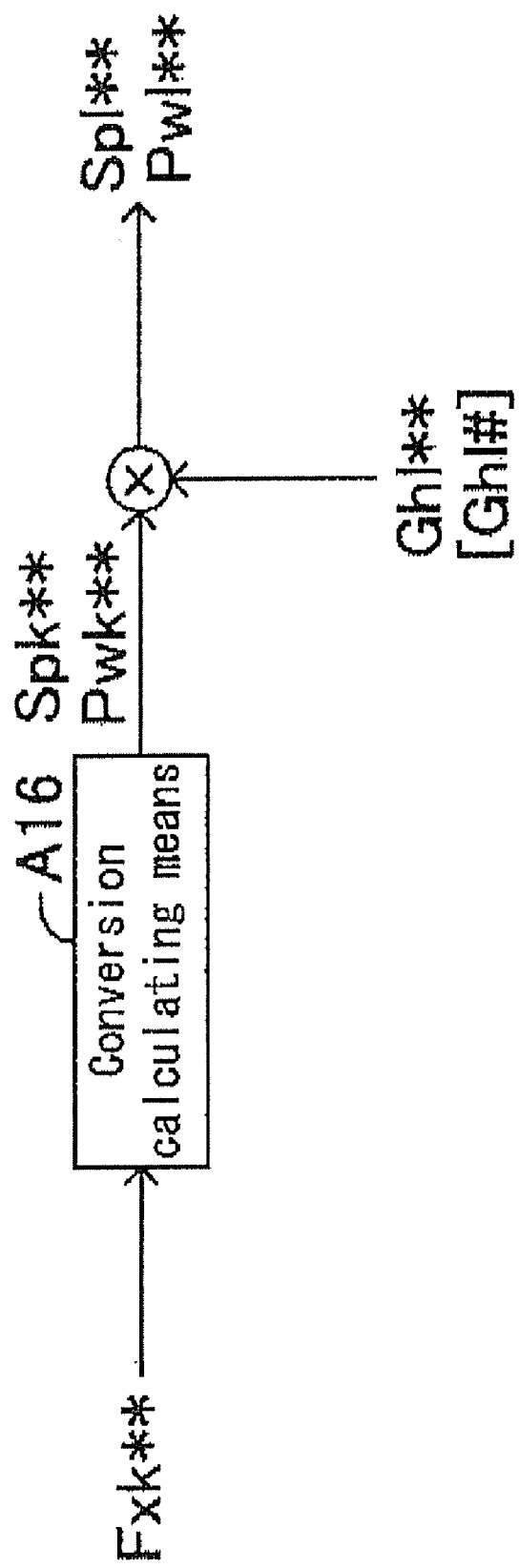
FIG. 8 is a functional block diagram indicating a case where a conversion calculating means is inserted after a braking force reference value calculating means in FIG. 5.

Additionally, in the third embodiment, as illustrated in FIG. 8, the device may be modified so as to further include a conversion calculating means A16, so that the conversion calculating means A16 executes a conversion calculation to the braking force reference value Fxk in order to convert the braking force reference value Fxk (Fxl) into the braking slip reference value Spk (Spl) or to the braking pressure reference value Pwk (Pwl**).

Additionally, by using a fact that the slip angle α of the wheel is substantially the same between the front-right wheel and front-left wheel or between the rear-right wheel and the rear-left wheel, a front wheel slip angle αf (=αfl=αfr) and a rear wheel slip angle αr (=αrl=αrr) may be used instead of the slip angle α of each wheel in the above-described embodiments. It is when the road surface friction coefficient is small (i.e. in the case where the vehicle travels on the road surface covered with snow, ice and the like) that the decrease of the lateral force becomes of concern while the vehicle stabilizing control is executed. In this case, the changes in the vertical load Fz generated while the vehicle turns is small. Therefore, it is conceivable that the vertical load Fz of the wheel is substantially the same between the front-right wheel and the front-rear wheel or between the rear-right wheel and the rear-left wheel. Accordingly, The front wheel vertical load Fzf (=Fzfl+Fzfr) and the rear wheel vertical load Fzr (=Fzrl+Fzrr) may be used instead of the vertical load Fz** of each wheel.

Described above is the case where the values for each wheel (the values indicated with the symbols "") are used. Alternatively, a case where the values relating to the front/rear wheel system (the values indicated with the symbol "#") are used may occur. In order to explain the case where the values relating to the front/rear wheel system is used, with reference to the values indicated within square brackets in each drawing, the slip angle α, the vertical load Fz, the lateral force reference value Fyk, the value "µ·Fz", the lateral force actual value Fya, the lateral force deviation ΔFy (=Fya−Fyk), the adjustment value Gfs, the adjustment value Gfl* and the adjustment value Ghl** are replaced with the slip angle α#, the vertical load Fz#, the lateral force reference value Fyk#, the value "µ·Fz#", the lateral force actual value Fya#, the lateral force deviation ΔFy# (=Fya#−Fyk#), the adjustment value Gfs#, the adjustment value Gfl# and the adjustment value Ghl#, respectively. In this case, the lateral force actual value Fya# (the actual value Fya# of the sum of the lateral forces) is calculated at the sum of lateral force calculating means A8c.

In the above-described embodiments, the value (the value determined with reference to one (1)), which is used to multiply the corresponding value, is used as the adjustment value (Gfs, Gfs#, Gfl, Gfl#, Ghl**, Ghl#) for adjusting the corresponding value. However, a value (a value determined with reference to zero (0)), which is added/subtracted to/from the corresponding value, may be used as the adjustment value for adjusting the corresponding value.

A motion control device for the vehicle according to fourth, fifth and sixth embodiments will be described below.

Fourth Embodiment

The motion control device according to the fourth embodiment will be described. In the first embodiment, the wheel target value Fxs, which is calculated on the basis of the motion state quantity of the vehicle, is modulated on the basis of the comparison result between the lateral force reference value Fyk and the lateral force actual value Fya (i.e. the deviation ΔFy=Fya−Fyk) in order to obtain the final wheel target value Fxt. Then, the braking force actual value Fxa is controlled so as to correspond to the target value Fxt on the basis of the final wheel target value Fxt at the braking torque modulating means A10. On the other hand, in the fourth embodiment, the braking force target value Fxt, which is modulated on the basis of the deviation ΔFy, is not calculated. Alternatively, a control mode is determined on the basis of the comparison result between the lateral force reference value Fyk and the lateral force actual value Fya (i.e. the deviation ΔFy), so that the modulation (e.g. the decrease and the like) is executed to the braking force by the control mode intervening relative to the braking torque modulating means A10. In other words, generally, the braking force actual value Fxa is controlled on the basis of the target value Fxs. On the other hand, in the fourth embodiment, when the control mode, which is calculated on the basis of the comparison result between the lateral force reference value Fyk and the lateral force actual value Fya (i.e. the deviation ΔFy), intervenes relative to the braking torque modulating means A10, the braking force is decreased, maintained or increased depending on the control mode.

Figure 9:
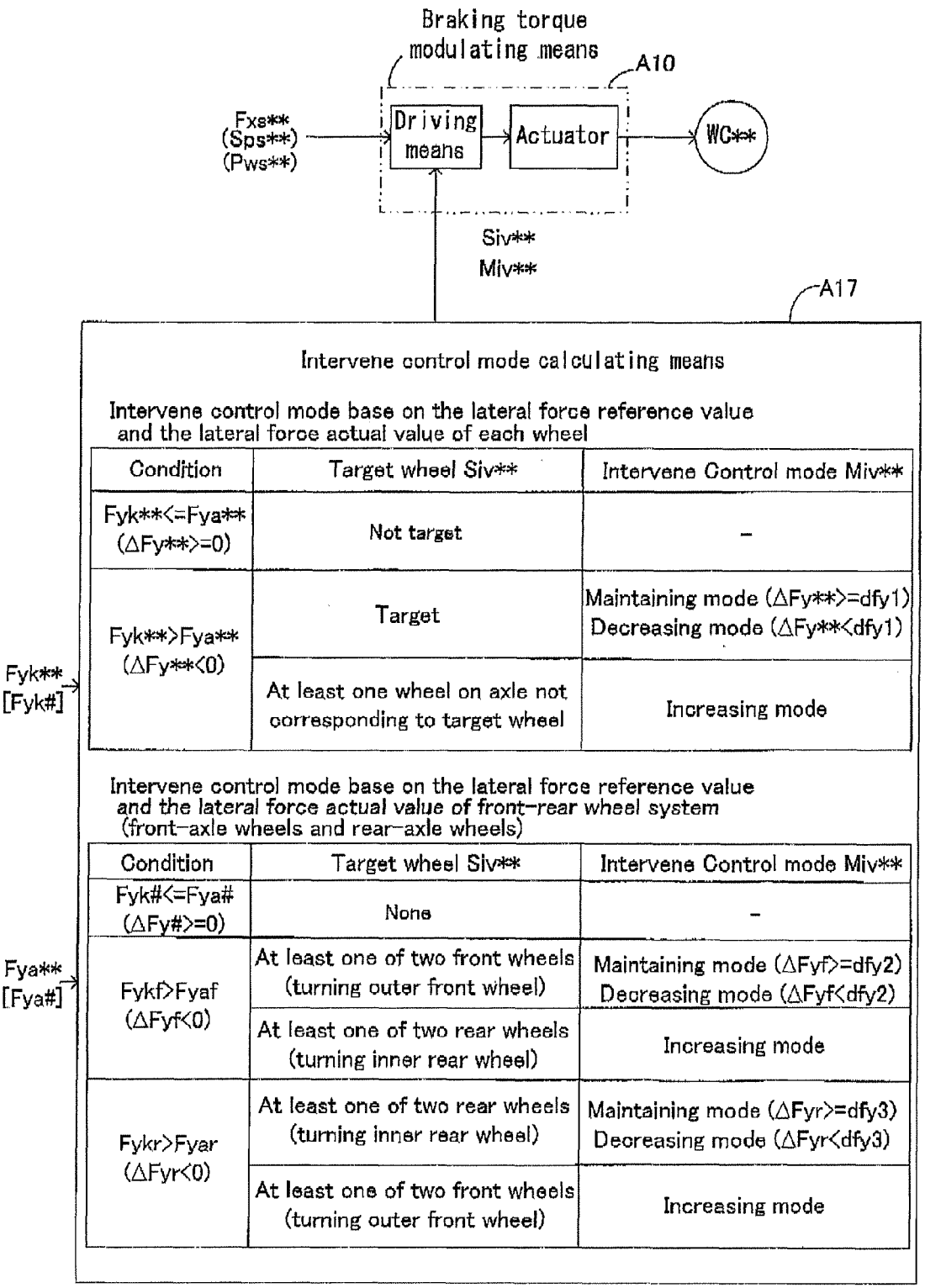
FIG. 9 is a functional block diagram in a case where the vehicle stabilizing control is executed by means of a motion control device according to a fourth embodiment of the present invention.

More specifically, as illustrated in the functional block diagram in FIG. 9, the motion control device of the fourth embodiment further includes an intervene control mode calculating means A17. Firstly, a case where the comparison between the lateral force actual value Fya and the lateral force reference value Fyk is executed for each wheel (i.e. an intervene control mode based on the lateral force reference value and the lateral force actual value of each wheel) will be described below. In this case, at the intervene control mode calculating means A17, a wheel Siv to be targeted for an intervention of the control mode (i.e. a target wheel Siv) and a control mode Miv to intervene relative to the braking torque modulating means A10 are determined on the basis of the comparison result between the lateral force reference value Fyk and the lateral force actual value Fya. The determined wheel Siv and the control mode Miv** are outputted to the braking torque modulating means A10 (the driving means).

In the case where the lateral force actual value Fya is equal to or greater than the lateral force reference value Fyk (i.e. in the case where the deviation ΔFy is equal to or greater than zero (0)), a sufficient lateral force is generated at the corresponding wheel. Therefore, the wheel, at which the sufficient lateral force is generated, is not determined as the target wheel to be intervened by the control mode, and the intervene control mode is not calculated. On the other hand, in the case where the lateral force actual value Fya is less than the lateral force reference value Fyk (i.e. in the case where the deviation ΔFy is less than zero (0)), the wheel, at which the lateral force actual value Fya is less than the lateral force reference value Fyk, is selected as the target wheel Siv, and the control mode Miv to intervene relative to the braking torque modulating means A10 is determined. More specifically, in a case where the deviation ΔFy (<0) is equal to or greater than a predetermined value dfy1, a maintaining mode for maintaining the braking force is determined as the intervene control mode. On the other hand, in a case where the deviation ΔFy (<0) is less than the predetermined value dfy1, a decreasing mode for decreasing the braking force is determined as the intervene control mode. In the case where the lateral force actual value Fya is less than the lateral force reference value Fyk (i.e. in the case where the deviation ΔFy is less than zero (0) (i.e. ΔFy<0)), the slip angle α of the wheel (the target wheel Siv) may not be appropriate (i.e. may be insufficient or excessive). In this case, at least one of the whealls, which are provided at the axle other than the axle on which the target wheel is provided, (e.g. at least one of the rear-wheels in a case where the target wheel is the front-wheel) is also selected as another target wheel, so that an increasing mode is set for the target wheel (the another target wheel) (which will be described in more detail below).

At the braking torque modulating means A10, generally, the braking torque (a braking hydraulic pressure) is modulated on the basis of the braking force target value Fxs, so that the braking force generated by the wheel is controlled. On the other hand, in the case where the target wheel Siv and the control mode Miv are calculated and inputted into the braking torque modulating means A10, the braking torque (the braking hydraulic pressure) is modulated on the basis of the intervene control mode, without being influenced by the braking force target value Fxs. More specifically, when the maintaining mode intervenes relative to the braking torque modulating means A10, the braking torque is maintained so as to be constant. On the other hand, when the decreasing mode intervenes relative to the braking torque modulating means A10, the braking torque is decreased. Furthermore, when the increasing mode intervenes relative to the braking torque modulating means A10, the braking torque is increased.

Described above is the case where the comparison between the lateral force actual value Fya and the lateral force reference value Fyk is executed for each wheel. Hereinbelow, a case where the comparison between the lateral force actual value Fya# (the actual value Fya# of the sum of the lateral forces) and the lateral force reference value Fyk** (the reference value Fyk# of the sum of the lateral force) is executed for each axle (i.e. the front wheel system and the rear wheel system) (i.e. a case where the intervene control mode is determined on the basis of the lateral force reference value and the lateral force actual value of the front and rear wheel systems) will be described.

In the case where the lateral force actual value Fya# is equal to or greater than the lateral force reference value Fyk# (i.e. in the case where the deviation ΔFy# is equal to or greater than zero (0)), the target wheel to which the control mode intervenes is not set and the intervene control mode is not calculated.

In a case where the lateral force actual value Fyaf is less than the lateral force reference value Fykf (i.e. in the case where the deviation ΔFyf is less than zero (0)) in the front wheel system, at least one of two front wheels is selected as the target wheel, and the control mode Miv to intervene relative to the braking torque modulating means A10 is determined. More specifically, in a case where the deviation ΔFyf is equal to or greater than a predetermined value dfy2, the maintaining mode for maintaining the braking torque is determined as the intervene control mode. The braking torque is generally controlled on the basis of the braking force target value Fxs. However, once the maintaining mode intervenes to the braking torque modulating means A10, the braking torque of the target wheel is maintained to be constant. On the other hand, in a case where the deviation ΔFyf is less than the predetermined value dfy2, the decreasing mode for decreasing the braking torque is determined as the intervene control mode. In this case, the braking torque of the target wheel is decreased without being influenced by the value of the braking force target value Fxs. Additionally, in the case where the lateral force actual value Fyaf is less than the lateral force reference value Fykf (i.e. in the case where the deviation ΔFyf is less than zero (0) (i.e. ΔFyf<0)), a case where the slip angle αf of the wheel at the front wheel system is not appropriate (insufficient) may occur. In this case, at least one of two rear wheels is selected as another target wheel. Then, the increasing mode is set for the another target wheel, so that the braking torque of the another target wheel is increased without being influenced by the braking force target value Fxs (which will be described in more detail below).

In a case where the lateral force actual value Fyar is less than the lateral force reference value Fykr (i.e. in the case where the deviation ΔFyr is less than zero (0)) in the rear wheel system, at least one of two rear wheels is selected as the target wheel, and the control mode Miv* to intervene relative to the braking torque modulating means A10 is determined. More specifically, in a case where the deviation ΔFyr is equal to or greater than a predetermined value dfy3, the maintaining mode for maintaining the braking force is determined as the intervene control mode. Generally, the braking torque is controlled on the basis of the braking force target value Fxs. However, when the maintaining mode intervenes relative to the braking torque modulating means A10, the braking torque of the target wheel is maintained to be constant. On the other hand, in a case where the deviation ΔFyr is less than the predetermined value dfy3, the decreasing mode for decreasing the braking torque is determined. In this case, the braking torque of the target wheel is decreased without being influenced by the value of the braking force target value Fxs. In the case where the lateral force actual value Fyar is less than the lateral force reference value Fykr (i.e. in the case where the deviation ΔFyr is less than zero (0) (i.e. ΔFyr<0)), a case where the slip angle αr of the wheel in the rear wheel system is not appropriate (excessive) may occur. In this case, at least one of two front wheels is selected as another target wheel. Then, the increasing mode is set for the another target wheel, so that the braking torque of the another target wheel is increased without being influenced by the value of the braking force target value Fxs** (which will be described in more detail below).

Even in the fourth embodiment, the similar advantages and effects as the above-described embodiments are achievable. More specifically, in a case where the lateral force reference value Fyk (or Fyk#) is a value existing within the "range in which the decreasing amount of the lateral force Fy relative to the increase of the longitudinal force Fx is small", the lateral force reference value Fyk (or Fyk#) is set to the value to be ensured in order to restrict the increase of the turning radius, and where the lateral force actual value Fya** is less than the lateral force reference value Fyk* (Deviation ΔFy**<0) (or, the actual value Fya# of the sum of the lateral forces is less than the reference value Fyk# of the sum of the lateral forces (Deviation ΔFy#<0)), the corresponding wheel (or, at least one of the wheels provided at the corresponding axle) is selected as the target wheel. The control mode for maintaining or decreasing the braking force intervenes relative to the target wheel, so that the increase of the braking torque of the target wheel is restricted and the increase of the braking force of the target wheel is restricted. As a result, because the lateral force is maintained or increased, the increase of the turning radius of the vehicle is restricted while ensuring the vehicle stability.

Additionally, in the case where the slip angle α** (or α#) of the target wheel (the wheel to which the control mode for maintaining or decreasing the braking force intervenes) is not appropriate, the increasing mode may be set to at least one of the wheels, which are provided at the axle different from the axle on which the target wheel is provided. Accordingly, even in the case where the slip angle of the target wheel is not appropriate, the slip angle of the target wheel is controlled so as to become appropriate, thereby further ensuring the lateral force at the target wheel. Hereinbelow, this will be described in more detail with reference to FIGS. 10 and 11.

Figure 10:
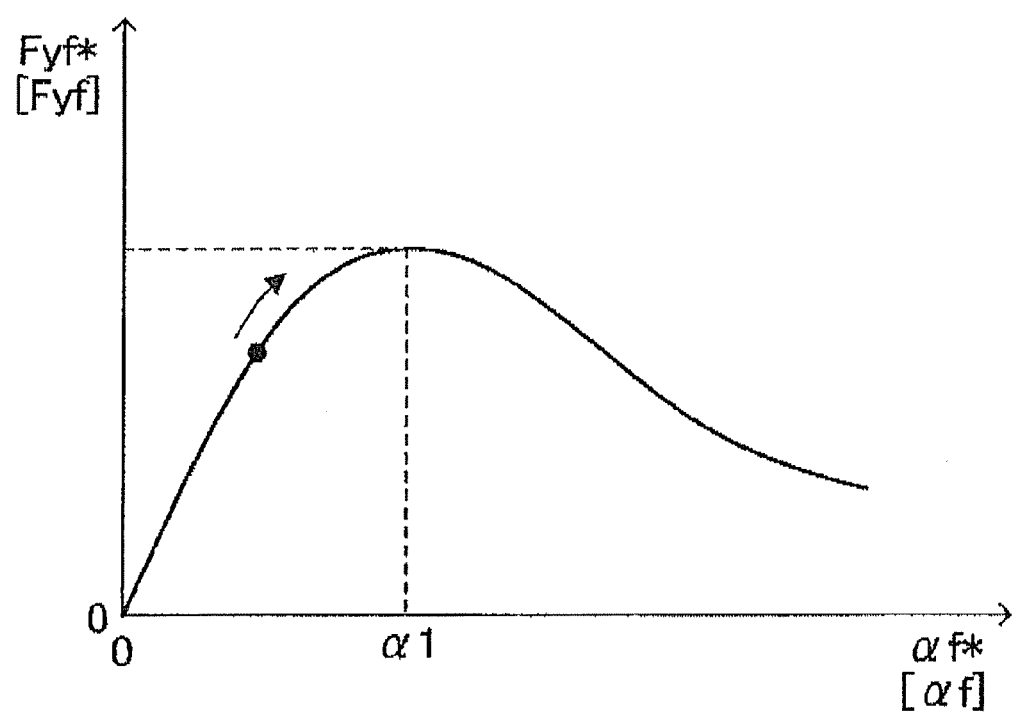
FIG. 10 is a graph for explaining a case where a lateral force of a front wheel is increased by increasing a wheel slip angle of the front wheel in a case where the wheel slip angle of the front wheel is lacking.

A case where the front wheel is selected as the target wheel (the wheel to which the maintaining or decreasing control mode intervenes) will be described below. In this case, as illustrated in FIG. 10, in a case where the slip angle αf* (or αf) of the target wheel is less than an appropriate value α1, which corresponds to a peak of the lateral force Fyf* (or Fyf) of the front wheel (i.e. in a case where the slip angle αf* (or αf) of the target wheel is insufficient), the braking torque of at least one of two rear wheels is increased in the fourth embodiment. Accordingly, the sum of the lateral forces generated at two rear wheels decreases, thereby increasing the slip angle of the vehicle body. As a result, the slip angle of the front wheel increases and the slip angle αf* (or αf) of the target wheel approximates to the appropriate value α1 (see an arrow in FIG. 10). That is to say, the slip angle of the target wheel is adjusted to become appropriate, so that the lateral force of the target wheel is further ensured. In other words, setting the increasing mode may effectively enhance maintenance or increase of the lateral force of the target wheel achieved by the intervention of the maintaining or decreasing mode relative to the target wheel.

Figure 11:
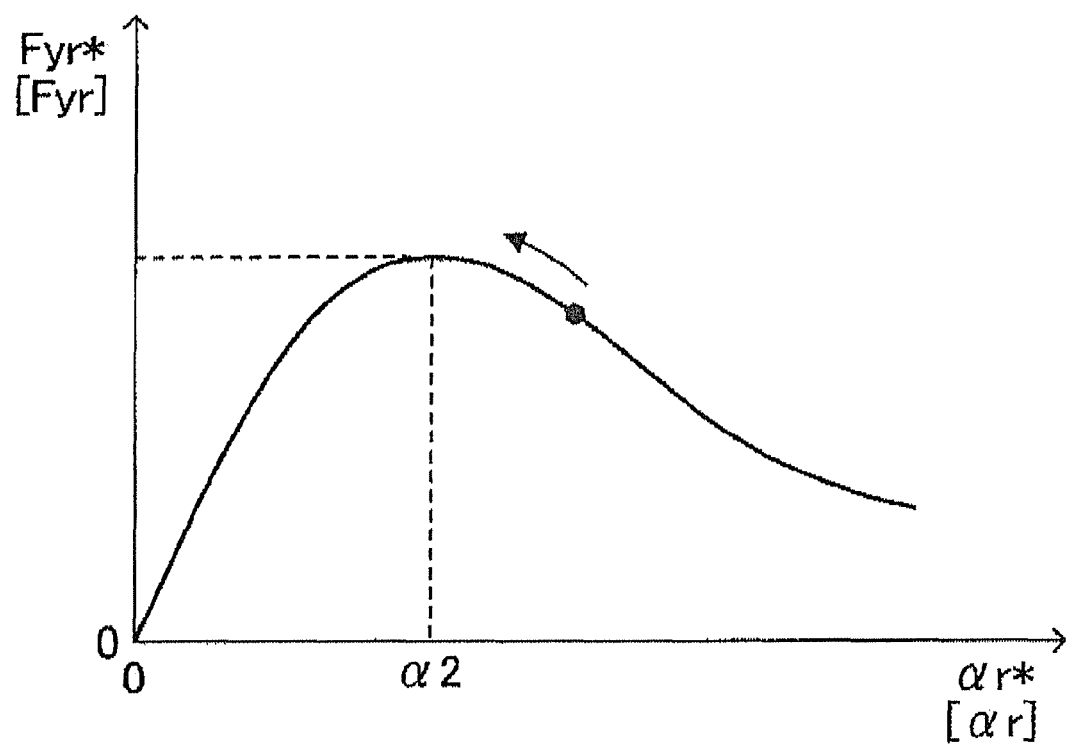
FIG. 11 is a graph for explaining a case where the lateral force of a rear wheel is increased by reducing the wheel slip angle of the rear wheel in a case where the wheel slip angle of the rear wheel is excessive.

A case where the rear wheel is determined as the target wheel (the wheel to which the maintaining or decreasing control mode intervenes) will be described below. In this case, as illustrated in FIG. 11, in a case where the slip angle αr* (or αr) of the target wheel is greater than an appropriate value α2, which corresponds to a peak of the lateral force Fyr* (or Fyr) of the rear wheel, (i e. in the case where the slip angle αr* (or αr) of the target wheel is excessive), the braking torque of at least one of two front wheels is increased in the fourth embodiment. Accordingly, the sum of the lateral forces of two front wheels decreases, thereby decreasing the slip angle of the vehicle body. As a result, the slip angle of the rear wheel decreases, and the slip angle αr* (or αr) of the target wheel approximates to the appropriate value α2 (see an arrow in FIG. 11). That is to say, even in this case, by setting the increasing mode, the slip angle of the target wheel may become appropriate and the maintenance or increase of the lateral force of the target wheel, achieved by the intervention of the maintaining or decreasing mode relative to the target wheel, may be effectively enhanced. As described above, the slip angle of the target wheel is calculated (obtained) by the slip angle calculating means A5 (or by a slip angle calculating means B6 (the slip angle obtaining means), which will be described below).

Specifically, in the case where the relationship "Fyaf<Fykf" (Deviation ΔFyf<0) is satisfied in the front wheel system while the vehicle stabilizing control (the ESC control) is executed, an oversteer restricting control is likely to be executed because the vehicle is in an oversteer state. In this case, the maintaining or decreasing mode intervenes relative to the turning outer front wheel, which is set as a control target for the oversteer restricting control. As a result, the decrease of the lateral force generated at the turning outer front wheel is restricted. Furthermore, in the case where the slip angle of the front wheels is insufficient (i.e. αf<α1), the increasing mode intervenes relative to the turning inner rear wheel. As a result, the slip angle of the front wheels may be adjusted to become appropriate, so that the lateral force generated at the front wheels may be increased.

On the other hand, in the case where the relationship "Fyar<Fykr" (Deviation ΔFyr<0) is satisfied in the rear wheel system while the vehicle stabilizing control (the ESC control) is executed, an understeer restricting control is likely to be executed because the vehicle is in an understeer state. In this case, the maintaining or decreasing mode intervenes relative to the turning inner rear wheel, which is set as a control target for the understeer restricting control. As a result, the decrease of the lateral force generated at the turning inner rear wheel is restricted. Furthermore, in the case where the slip angle of the rear wheels is excessive (i.e. αr>α2), the increasing mode intervenes relative to the turning outer front wheel. As a result, the slip angle of the rear wheels may be adjusted to become appropriate, so that the lateral force generated at the rear wheels may be increased.

Fifth Embodiment

The motion control device according to the fifth embodiment will be described below. Described in the first, second, third and fourth embodiments is the motion control device for the vehicle in which the vehicle stabilizing control (the ESC control) for stabilizing the turning state of the vehicle is executed on the basis of the motion state quantity of the vehicle. On the other hand, in the fifth embodiment, the motion control device for the vehicle, in which the slip restricting control for maintaining the traveling stability of the vehicle by restricting the longitudinal slip (e.g. a slip speed, the slip ratio and the like) generated at the wheel on the basis of the wheel speed, will be described.

In the fifth embodiment, the anti-skid control and the electronic brake-force distribution control are adapted as the wheel slip restricting control. The lock tendency of the wheel (i.e. the increase of the longitudinal slip) is restricted and the lateral force generated at the wheel is ensured by the wheel slip restricting control, as a result, the traveling stability of the vehicle is maintained. As is the case with the above-described embodiments, symbols "" are used to comprehensively indicate wheels. In other words, the symbols "" indicates a relationship with any one or more of four wheels. For example, "fl" indicates a relationship with a front-left wheel, "fr" indicates a relationship with a front-right wheel, "rl" indicates a relationship with a rear-left wheel and "rr" indicates a relationship with a rear-right wheel. Furthermore, the symbols "f*" comprehensively indicate the front wheels. In other words, the symbols "f*" indicate a relationship with any one or more of the front wheels. Similarly, the symbols "r*" comprehensively indicate the rear wheels. In other words, the symbols "r*" indicate a relationship with any one or more of the rear wheels. The symbols "*i" comprehensively indicate turning inner wheels. More specifically, the symbols "*i" indicate a relationship with any one or more of the turning inner wheels. Additionally, the symbols "*o" comprehensively indicate turning outer wheels. More specifically, the symbols "*o" indicate that a relationship with any one or more of the turning outer wheels. Furthermore, in the embodiments, the symbol "#" comprehensively indicates a front-rear wheel systems. In other words, the symbol "#" indicates that a component, a part and the like are related to either one or both of a front-wheel axle system and a rear-wheel axle system. For example, "f" indicates the front-wheel axle system (i.e. relating to the wheels of the front axle) and "r" indicates the rear-wheel axle system (i.e. relating to the wheels of the rear axle).

Figure 12:
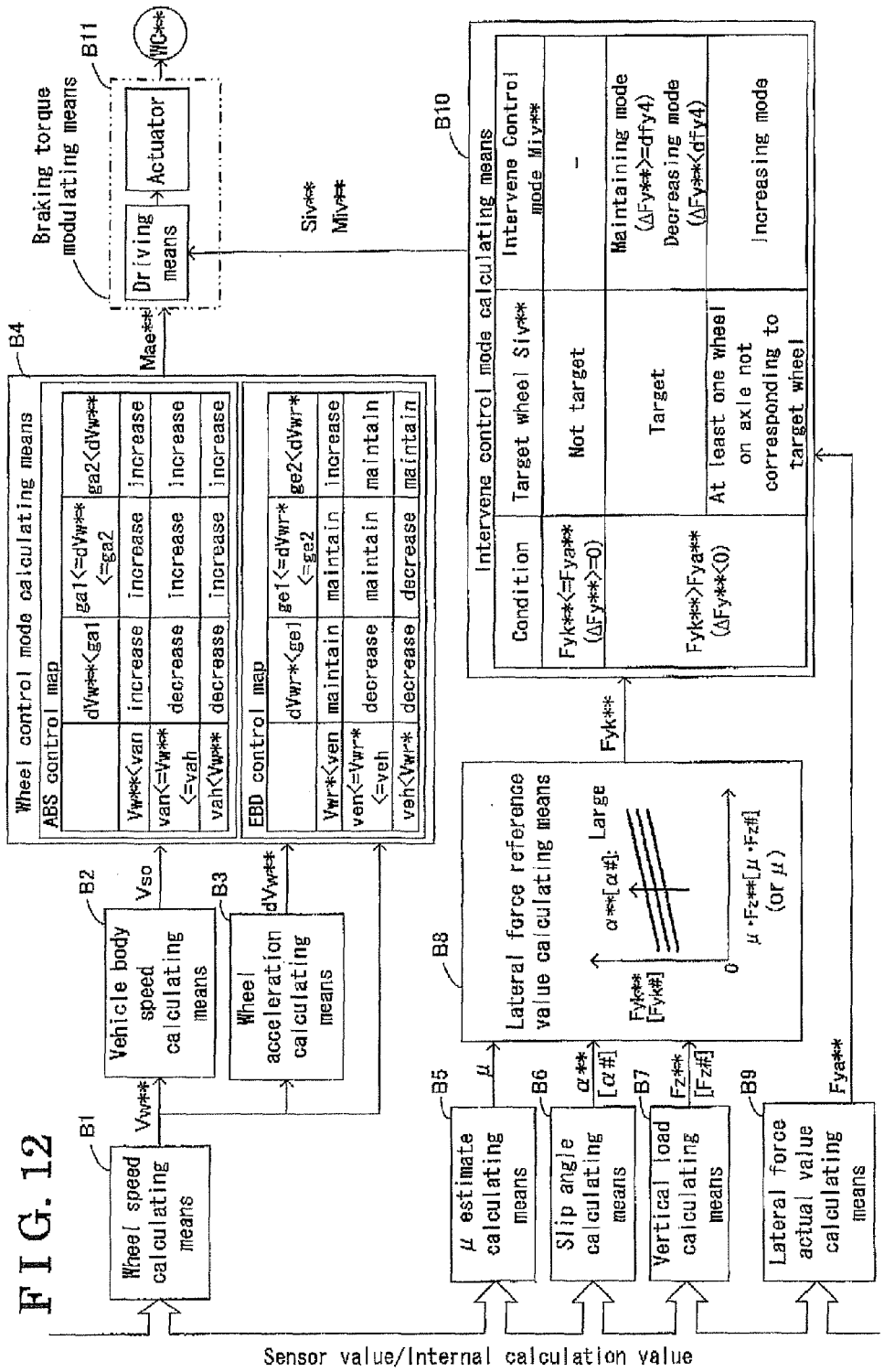
FIG. 12 is a functional block diagram in a case where a slip restricting control is executed by means of a motion control device according to a fifth embodiment of the present invention.

The motion control device of the fifth embodiment will be described below with reference to a functional block diagram in FIG. 12. At a wheel speed calculating means B1 (the wheel speed obtaining means), the wheel speed $Vw^{}$ is obtained via the wheel speed sensor $WS^{}$ or the communication bus. At a vehicle body speed calculating means B2, a vehicle body speed Vso is calculated on the basis of the wheel speed $Vw^{}$ of each wheel by using the known method. At a wheel acceleration calculating means B3, a wheel acceleration $dVw^{}$ is calculated on the basis of the wheel speed $Vw^{**}$ of each wheel by using the known method.

At a wheel control mode calculating means B4, a control mode $Mae^{**}$ of each wheel for the anti-skid control (the BAS control) or for the electronic brake-force distribution control (the EBD control) is calculated. Hereinbelow, firstly, the anti-skid control (the ABS control) will be described.

<Control Mode Calculation for Anti-Skid Control>

Reference wheel speeds van and vah for the anti-skid control (the ABS control) are calculated by subtracting predetermined values sp1 and sp2 from the vehicle body speed Vso, respectively. The predetermined values sp1 and sp2 represent preliminarily set longitudinal slip speeds. Furthermore, the predetermined value sp1 is set to be less than the predetermined value sp2 (i.e. sp1<sp2). The wheel speed $Vw^{}$ is compared with each of the reference wheel speeds van and vah for the ABS control, and the wheel acceleration $dVw^{}$ is compared with reference accelerations ga1 and ga2 for the ABS control. The reference accelerations ga1 and ga2 are preliminarily set predetermined values. Furthermore, the reference acceleration ga1 is set to be less than the reference acceleration value ga2 (i.e. ga1<ga2). An ABS control map within the calculating means B4 is referred to in order to select the control mode on the basis of the comparison result among those values.

The control mode for the ABS control includes an increasing mode for increasing the braking torque (which is indicated as "increase" in the map) and a decreasing mode for decreasing the braking torque (which is indicated as "decrease" in the map). For example, in a case where the wheel speed $Vw^{}$ is equal to or greater than the reference speed van and equal to or less than the reference speed vah, and where the wheel acceleration $dVW^{}$ is equal to or greater than the reference acceleration ga1 and equal to or less than the reference acceleration ga2, the increasing mode for increasing the braking torque is selected.

<Control Mode Calculation for Electronic Brake-Force Distribution Control>

Reference wheel speeds ven and veh for the electronic brake-force distribution control (the EBD control) are calculated by subtracting predetermined values sq1 and sq2 from the vehicle body speed Vso, respectively. The predetermined values sq1 and sq2 represent preliminarily set longitudinal slip speeds. Furthermore, the predetermined value sq1 is set to be less than the predetermined value sq2 (i.e. sq1<sq2). In the EBD control, the rear wheels are set as the target wheels to be controlled. Therefore, the wheel speed $Vwr^*$ of the rear wheel is compared with the reference wheel speeds ven and veh for the EBD control, and the wheel acceleration $dVwr^*$ is compared with reference accelerations ge1 and ge2 for the EBD control. The reference accelerations ge1 and ge2 are preliminarily set predetermined values. Furthermore, the reference acceleration ge1 is set to be less than the reference acceleration value ge2 (i.e. ge1<ge2). An EBD control map within the calculating means B4 is referred to in order to select the control mode on the basis of the comparison result among those values.

The control mode for the EBD control includes an increasing mode for increasing the braking torque (which is indicated as "increase" in the map), a maintaining mode for maintaining the braking torque (which is indicated as "maintain" in the map), and a decreasing mode for decreasing the braking torque (which is indicated as "decrease" in the map). For example, in a case where the wheel speed $Vwr^*$ of the rear wheel is equal to or greater than the reference speed ven and equal to or less than the reference speed veh, and where the wheel acceleration dVwr* of the rear wheel is equal to or greater than the reference acceleration ge1 and equal to or leas than the reference acceleration ge2, the maintaining mode for maintaining the braking torque is selected. On the other hand, in a case where the wheel speed Vwr* of the rear wheel is less than the reference value van and where the wheel acceleration dVwr* of the rear wheel is greater than the reference acceleration ge2, the increasing mode for increasing the braking torque is selected. The control mode for the ABS control precedes the control mode for the EBD control.

A μ estimate calculating means B5 (the friction coefficient obtaining means), the slip angle calculating means B6, a vertical load calculating means B7 (the vertical load obtaining means), a lateral force reference value calculating means B8 and a lateral force actual value calculating means B9 (the lateral force actual value obtaining means) have similar functions and configurations as the above-described μ estimate calculating means A4, the slip angle calculating means A5, the vehicle load calculating means A6, the lateral force reference value calculating means A7 and the lateral force actual value calculating means A8. Therefore, the detailed explanation about the means having the similar functions and configurations as the means described in the above embodiments will be omitted here. At the lateral force actual value calculating means B9, the actual value Fya of the lateral force (i.e. the lateral force actual value Fya) of the wheel WH** may be calculated on the basis of the methods explained above with reference to FIGS. 6 and 7. In this case, the yaw moment Mfx may be removed from the above-described Equation 3 because the anti-skid control and the electronic brake-force distribution control are not for stabilizing the vehicle by using the difference of the braking force (the longitudinal force) between the right and left wheels.

An intervene control mode calculating means B10 has similar configuration as the intervene control mode calculating means A17 of the fourth embodiment (see FIG. 10) except that the intervene control mode calculating means B10 has a different configuration corresponding to the "intervene control mode based on the lateral force reference value and the lateral force actual value of each wheel" (see FIG. 9) in the intervene control mode calculating means A17 and that the predetermined value dfy1 is replaced with a predetermined value dfy4. Accordingly, a detailed explanation about the intervene control mode calculating means B10 will be also omitted. Signals relating to the target wheel Siv and the control mode Miv, which are determined on the basis of the deviation ΔFy between the lateral force actual value Fya and the lateral force reference value Fyk (i.e. ΔFy=Fya−Fyk) at the intervene control mode calculating means B10, are outputted to a braking torque modulating means B11 (the driving means).

At the braking torque modulating means B11, the driving means of the brake actuator BRK (the braking apparatus) (e.g. the electric motor for the hydraulic pump, the driving means of the solenoid valve and the like) is controlled on the basis of the control mode Mae or Miv of each wheel. More specifically, at the braking torque modulating means B11, generally, the braking torque (the braking hydraulic pressure) is modulated on the basis of the control mode Mae for the ABS control or the EBD control, so that the braking force generated by the wheel is controlled. However, when the target wheel Siv and the control mode Miv are calculated at the intervene control mode calculating means B10 and the calculated target wheel Siv and the control mode Miv are inputted into the braking torque modulating means B11, the modulation on the braking torque (the braking hydraulic pressure) is executed on the basis of the intervene control mode Miv without being influenced by the control mode Mae. In other words, the braking torque is modulated by the intervene control mode Miv which precedes the control mode Mae**.

More specifically, when the maintaining mode intervenes relative to the braking torque modulating means B11 as the intervene control mode Miv, the braking torque is maintained to be constant. On the other hand, when the decreasing mode intervenes relative to the braking torque modulating means B11 as the intervene control mode Miv, the braking torque is reduced. Furthermore, when the increasing mode intervenes relative to the braking torque modulating means B11, the braking torque is increased.

Even in the fifth embodiment, similar advantages and effects as the above-described fourth embodiment are achievable. More specifically, the lateral force reference value Fyk exists within the "range in which the decreasing amount of the lateral force Fy is small relative to the increase of the longitudinal force Fx (the braking force Fx)", which is illustrated in FIG. 3. Furthermore, the lateral force reference value Fyk is set to be the value to be ensured in order to restrict the increase of the turning radius. In the case where the lateral force actual value Fya* is less than the lateral force reference value Fyk (i.e. Fya<Fyk, Deviation ΔFy<0), the maintaining or decreasing control mode intervenes relative to the target wheel, so that the increase of the braking torque generated at the target wheel is restricted and so that the increase of the braking force at the target wheel is restricted. As a result, the lateral force is maintained or increased, so that the increase of the turning radius of the vehicle is restricted while ensuring the vehicle stability. Additionally, in the case where the slip angle α* of the target wheel (i.e. the wheel to which the maintaining or decreasing control mode intervenes) is not appropriate, the increasing mode is set to at least one of the wheels provided at the axle, which differs from the axle on which the target wheel is provided. Accordingly, even in the case where the slip angle of the target wheel is not appropriate, the inappropriate slip angle is adjusted to become appropriate, so that the lateral force of the target wheel is further ensured.

Sixth Embodiment

The motion control device according to the sixth embodiment will be described below. The motion control device of the sixth embodiment differs from the motion control device of the fifth embodiment in that the motion control device of the sixth embodiment has a different calculation method for calculating the target wheel Siv and the intervene control mode Miv at the intervene control mode calculating means B10. In the fifth embodiment, the comparison between the lateral force actual value Fya and the lateral force reference value Fyk is executed for each wheel in order to determine the target wheel Siv to be intervened and the intervene control mode Miv. On the other hand, in the sixth embodiment, the lateral force actual value Fya# (the actual value Fya™ of the sum of the lateral forces) is compared with the lateral force reference value Fyk# (the reference value Fyk# of the sum of the lateral forces) for each axle (i.e. the front wheel system, the rear wheel system) in order to determine the target wheel Siv and the intervene control mode Miv.

The intervene control mode calculating means B10 in the sixth embodiment has a similar configuration with the intervene control mode calculating means A17 (see FIG. 10) except that the intervene control mode calculating means B10 has different configuration corresponding to the "intervene control mode based on the lateral force reference value and the lateral force actual value of front/rear wheel systems" in the intervene control mode calculating means A17 (see FIG. 9) and that the predetermined values dfy2 and dfy3 are replaced with predetermined values dfy5 and dfy6, respectively. Accordingly, a detailed explanation about the intervene control mode calculating means B10 of the sixth embodiment will be also omitted.

Additionally, the lateral force actual value Fya# (the actual value Fya# of the sum of the lateral forces) is calculated on the basis of, for example, the above-described Equation 3 by using the lateral acceleration Gy and the yaw angular acceleration dYr, which is obtained by differentiating the yaw rate Yr by time. The yaw moment Mfx may be omitted. The lateral force reference value Fyk# (the reference value Fyk# of the sum of the lateral forces) is determined on the basis of the above-described method, in which the slip angle $\alpha^{}$, the vertical load $Fz^{}$ and the value "$\mu \cdot Fz^{**}$" are replaced with the slip angle $\alpha\#$, the vertical load $Fz\#$ and the value "$\mu \cdot Fz\#$", respectively.

Even in the sixth embodiment, similar advantages and effects as the motion control device of the fourth embodiment are achievable. In other words, the lateral force reference value Fyk# is set to be the value that exists within "the range in which the decreasing amount of the lateral force Fy is small relative to the increase of the longitudinal force Fx (the braking force Fx)", which is illustrated in FIG. 3. Furthermore, the lateral force reference value Fyk# is set to be the value to be ensured in order to restrict the increase of the turning radius.

In the case where the relationship "Fyaf<Fykf" (Deviation ΔFyf<0) is satisfied in the front wheel system, the maintaining or decreasing mode intervenes relative to at least one of two front wheels (e.g. the turning outer front wheel) in order to restrict the decrease of the lateral force of the wheel to be intervened. Furthermore, in the case where the slip angle of the front wheel system is insufficient (i.e. $\alpha f < \alpha 1$, see FIG. 10 for the value $\alpha 1$), the increasing mode intervenes relative to at least one of two rear wheels (e.g. the turning inner rear wheel). Accordingly, the slip angle of the front wheel system is adjusted to become appropriate, so that the lateral force of the front wheel system is increased.

On the other hand, in the case where the relationship "Fyar<Fykr" (Deviation ΔFyr<0) is satisfied in the rear wheel system, the maintaining or decreasing mode intervenes relative to at least one of two rear wheels (e.g. the turning inner rear wheel) in order to restrict the decrease of the lateral force of the wheel to be intervened. Furthermore, in the case where the slip angle of the rear wheel system is excessive (i.e. $\alpha r > \alpha 2$, see FIG. 11 for the value $\alpha 2$), the increasing mode intervenes relative to at least one of two front wheels (e.g. the turning outer inner wheel). Accordingly, the slip angle of the rear wheel system is adjusted to become appropriate, so that the lateral force of rear wheel system is ensured.

The motion control device for the vehicle related to the present invention includes the controlling means (A2, A3, A9, A10, A11, A12, A13, A14, A15, A16, A17, B2, B3, B4, B10 and B11) for maintaining the traveling stability of the vehicle by controlling the braking force of the wheel of the vehicle. At the controlling means, for example, the vehicle stabilizing control and the slip restricting control are executed, so that the braking force (braking torque) itself, the braking hydraulic pressure, the longitudinal slip (slip ratio) and the like are controlled.

The motion control device for the vehicle related to the present invention is characterized as further including the friction coefficient obtaining means (A4, B5) for obtaining the friction coefficient ($\mu$) of the road surface on which the vehicle travels, the lateral force reference value calculating means (A7, B8) for calculating the lateral force reference value (Fyk,Fyk#) acting on the wheel (WH) on the basis of the friction coefficient ($\mu$) of the road surface, the lateral force actual value obtaining means (A8, B9) for obtaining the lateral force actual value (Fya,Fya#) acting on the wheel (WH), and the controlling means (A9,A10,A11,A12,A13, A14,A15,A16,A17,B10,B11) controls the braking force of the wheel (WH) on the basis of a comparison result (ΔFy,ΔFy# and the like) between the lateral force reference value (Fyk,Fyk#) and the lateral force actual value (Fya, Fya#). The lateral force reference value may also be calculated on the basis of the vertical load (Fz,Fz#) acting on the wheel and the slip angle of the wheel ($\alpha^{}$,$\alpha\#$), in addition to the road surface friction coefficient.

At this point, the lateral force reference value exists within the "range in which the decreasing amount of the lateral force Fy is small relative to the increase of the longitudinal force Fx (the braking force Fx)", and the lateral force reference value may be the lateral force to be ensured at the wheel in order to restrict the increase of the turning radius of the vehicle. For example, in the case of the characteristic Ch3 in the graph of FIG. 14, the lateral force reference value may be calculated to be the value of the lateral force corresponding to the vicinity of the point B (See the value Fyk in FIG. 3, described later).

Figure 14:
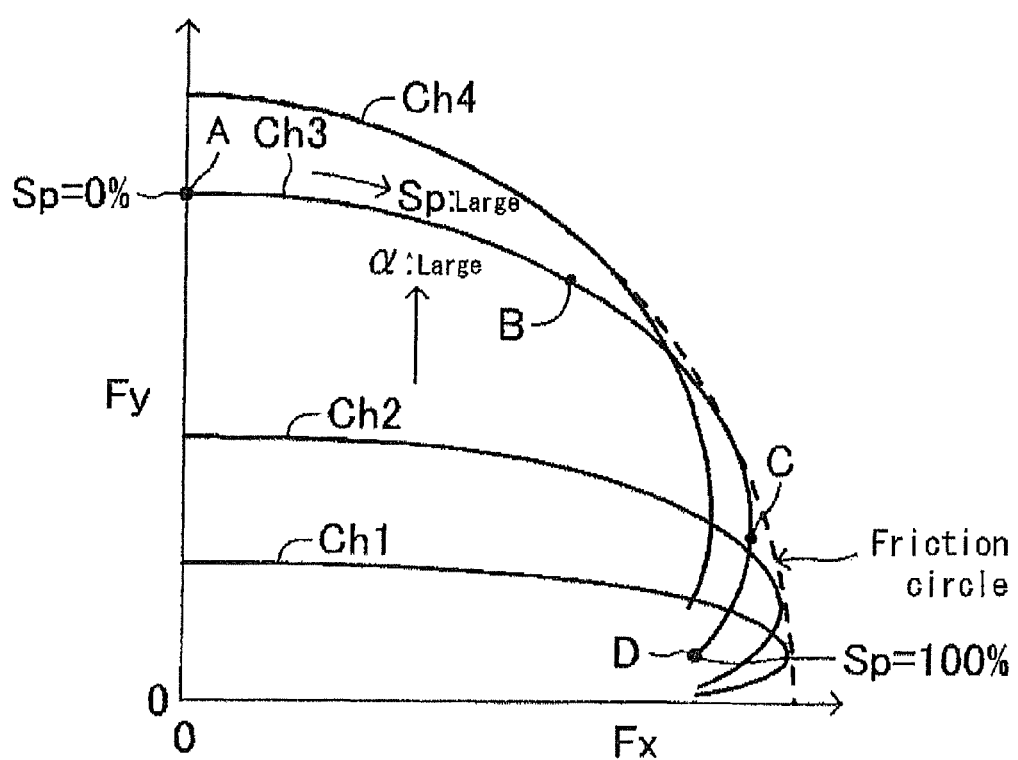
FIG. 14 is a graph for explaining a relationship between a longitudinal force (braking force) and a lateral force of a tire.

As indicated in the graph of FIG. 14, the Fx-Fy characteristic changes in accordance with the radius of the friction circle of the tire (indicated with the dashed line in FIG. 14) and the wheel slip angle. The radius of the friction circle of the tire is calculated by multiplying the vertical load by the road surface friction coefficient. Accordingly, the lateral force reference value (for example, the value of the lateral force corresponding to the vicinity of the point B in the graph of FIG. 14) may be calculated on the basis of the road surface friction coefficient, the vertical load and the wheel slip angle.

In a circumstance where the vehicle stabilizing control, the slip restricting control and the like are executed, the wheel slip angle is likely to reach a sufficiently great value and the lateral force is likely to be already saturated relative to an increase of the wheel slip angle. Therefore, when the lateral force reference value is calculated, the wheel slip angle is considered to be a sufficiently large value corresponding to, for example, the characteristic Ch4 indicated in the graph of FIG. 14. In this case, the lateral force reference value may be set to a value obtained by multiplying the radius of the friction circle by the predetermined coefficient (e.g., 0.7-0.8 and the like).

On the other hand, in a circumstance where the vehicle stabilizing control and the slip restricting control are executed, the increase of the turning radius of the vehicle caused by the decrease of the lateral force becomes obvious especially when the road surface friction coefficient is small. In this case, because a load shift hardly occurs at the vehicle, when the lateral force reference value is calculated, the vertical load may be considered as a value being equivalent to a static vertical load (known value).

Thus, by obtaining the road surface friction coefficient, the radius of the friction circle is calculated, as a result, the lateral force reference value may be calculated (e.g., lateral force reference value=radius of friction circle coefficient (0.7-0.8)). Thus, the lateral force reference value may be calculated on the basis of at least the road surface friction coefficient.

According to the above-mentioned configuration, the braking force at the wheel is modulated on the basis of the comparison result between the lateral force reference value and the lateral force actual value (controlled on the basis of the vehicle stabilizing control, the slip restricting control and the like). Specifically, the braking force is reduced in a case where the lateral force actual value is less than the lateral force reference value.

As seen in the Fx-Fy characteristic indicated in the graph of FIG. 14, in a case where the braking force (braking torque) applied to the wheel is reduced, the slip ratio is reduced, and the lateral force actual value is increased. Accordingly, in a case where the lateral force actual value is less than the lateral force reference value, by reducing the braking force (braking torque) applied to the wheel, the lateral force actual value is increased so as to be close to the lateral force reference value (or the lateral force actual value exceeds the lateral force reference value). Thus, the lateral force to be ensured at the wheel in order to restrict the increase of the turning radius of the vehicle is ensured.

Thus, according to the above-mentioned configuration, in the case where the vehicle stabilizing control and the slip restricting control and the like are executed, in view of the lateral force at the wheel, the increase of the turning radius of the vehicle caused by the lack of the lateral force may be restricted. Further, in a case where the lateral force actual value is larger than the lateral force reference value, the braking force (braking torque) applied to the wheel is small (accordingly, the slip ratio is small). In this case, the lateral force to be ensured at the wheel for restricting the increase of the turning radius of the vehicle has already been ensured.

In a case where the controlling means executes the vehicle stabilizing control, the motion control device for the vehicle related to the present invention further may be configured so as to include the turning motion state quantity obtaining means (A1) for obtaining the turning motion state quantity (Yr, Gy and the like) of the vehicle, and the controlling means (A2, A3, A9, A10, A11, A12, A13, A14, A15, A16 and A17) controls the braking force (braking torque) on the basis of the turning motion state quantity (Yr, Gy and the like).

In this case, the lateral force actual value obtaining means (A8) may be configured so as to include the braking force actual value obtaining means (A8*b*) for obtaining the braking force actual value (Fxa) and calculates the lateral force actual value (Fya, Fya#) on the basis of the turning motion state quantity (Yr, Gy and the like) of the vehicle and the braking force actual value (Fxa**).

Thus, the lateral force actual value (Fya**, Fya#) may be estimated by use of the detecting means and the like, that is needed to execute the vehicle stabilizing control, without using a means for directly detecting the lateral force.

In a case where the controlling means executes the longitudinal wheel slip restricting control, the motion control device for the vehicle related to the present invention may be configured so as to further include the wheel speed obtaining means (WS, B1) for obtaining the wheel speed (Vw) of the vehicles and the controlling means (B2, B3, B4, B10 and B11) restricts the longitudinal slip of the wheel by controlling the braking force on the basis of the wheel speed (Vw**).

In this case, the lateral force actual value obtaining means (B9) may configured so as to include the vehicle turning behavior obtaining means (A8*a*) for obtaining the turning motion state quantity (Yr, Gy) of the vehicle and calculate the lateral force actual value (Fya**,Fya#) on the basis of the turning motion state quantity (Yr, Gy) of the vehicle.

Thus, the lateral force actual value (Fya**,Fya#) may be estimated by use of the detecting means and the like, that is needed for executing the slip restricting control, without using the means for directly detecting the lateral force.

The motion control device related to the present invention may be configured so as to further include the braking force reference value calculating means (A11,A14) for calculating the reference values (Fxk,Spk,Pwk) corresponding to the braking force of the wheel on the basis of the road surface friction coefficient ($\mu$) and an adjusting means (A12,A15) for adjusting the reference value of the braking force corresponding value (Fxk,Spk,Pwk) so as to approximate the deviation between the lateral force reference value and the lateral force actual value to zero (0) on the basis of the comparison result ($\Delta$Fy,$\Delta$Fy# and the like), and the controlling means controls the braking force at the wheel on the basis of the adjusted reference value of the braking force corresponding value (Fxl,Spl,Pwl). The braking force corresponding value may be, for example, the braking force (braking torque) itself, braking hydraulic pressure, the longitudinal slip (slip ratio) and the like.

At this point, according to the Fx-Fy characteristic indicated in the graph of FIG. 14, the reference value of the braking force corresponding value is the braking force (a value corresponding to the braking force) corresponding to the lateral force reference value, and the reference value of the braking force corresponding value is also the braking force (the value corresponding to the braking force) to be applied for generating the lateral force to be ensured at the wheel in order to restrict the increase of the turning radius of the vehicle. With reference to the characteristic Ch2 indicated in the graph of FIG. 14, the reference value of the braking force may be calculated to be, for example, the braking force corresponding to the vicinity of the point B.

Thus, in the similar manner as the case of the lateral force reference value, the reference value of the braking force corresponding value may be calculated on the basis of the road surface friction coefficient, the vertical load and the wheel slip angle, or on the basis of at least the road surface friction coefficient. Further, the reference value of the braking force corresponding value may be calculated on the basis of the radius of the friction circle and the lateral force reference value (and an equation of a circle indicating the friction circle).

In the above-mentioned configuration, on the basis of the comparison result between the lateral force reference value and the lateral force actual value, the reference value of the braking force corresponding value is adjusted so as to approximate the deviation between the lateral force reference value and the lateral force actual value to zero (0). Specifically, in a case where the lateral force actual value is larger (smaller) than the lateral force reference value, the reference value of the braking force corresponding value is increased (reduced). Thus, because the reference value of the braking force corresponding value is adjusted, the reference value of the braking force corresponding value may be adjusted to the braking value (the value corresponding to the braking value) to be applied in order to control the lateral force actual value so as to agree with the lateral force reference value. The adjusted reference value mentioned above will be referred to as an "adjusted reference value".

On the basis of the "adjusted reference value", the braking force is controlled. Specifically, for example, the braking force is adjusted to be a smaller value being determined by comparing the adjusted reference value to a braking force being set on the basis of the motion state quantity or the wheel speed (in other words, the vehicle stabilizing control or the slip restricting control). In other words, the braking force is calculated so as not to exceed the "adjusted reference value".

Thus, an occurrence of a case where the lateral force actual value becomes less than the lateral force reference value, which is caused by the braking force (the value corresponding to the braking force) exceeding the "adjusted reference value", may be restricted. Accordingly, the lateral force to be ensured at the wheel in order to restrict the increase of the turning radius of the vehicle is also ensured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motion control device for a vehicle comprising:
   a controlling means for maintaining a traveling stability of the vehicle by controlling a braking force of a wheel of the vehicle;
   a friction coefficient obtaining means for obtaining a friction coefficient of a road surface on which the vehicle travels;
   a lateral force reference value calculating means for calculating a lateral force reference value acting on the wheel on the basis of the friction coefficient of the road surface; and
   a lateral force actual value obtaining means for obtaining a lateral force actual value acting on the wheel, wherein
   the controlling means controls the braking force on the basis of a comparison result between the lateral force reference value and the lateral force actual value.

2. The motion control device for the vehicle according to claim 1, wherein the controlling means reduces the braking force in a case where the lateral force actual value is less than the lateral force reference value.

3. The motion control device for the vehicle according to claim 2 further including a motion state quantity obtaining means for obtaining a motion state quantity of the vehicle, wherein the controlling means controls the braking force on the basis of the motion state quantity.

4. The motion control device for the vehicle according to claim 3, wherein the lateral force actual value obtaining means includes a braking force actual value obtaining means for obtaining a braking force actual value and calculates the lateral force actual value on the basis of the motion state quantity of the vehicle and the braking force actual value.

5. The motion control device for the vehicle according to claim 2 further including a wheel speed obtaining means for obtaining a wheel speed of the vehicle, wherein the controlling means restricts a longitudinal slip of the wheel by controlling the braking force on the basis of the wheel speed.

6. The motion control device for the vehicle according to claim 5, wherein the lateral force actual value obtaining means includes a vehicle behavior obtaining means for obtaining a motion state quantity of the vehicle and calculates the lateral force actual value on the basis of the motion state quantity.

7. The motion control device for the vehicle according to claim 1 further including a vertical load obtaining means for obtaining a vertical load acting on the wheel, wherein the lateral force reference value calculating means calculates the lateral force reference value acting on the wheel on the basis of the vertical load.

8. The motion control device for the vehicle according to claim 7, wherein the controlling means reduces the braking force in a case where the lateral force actual value is less than the lateral force reference value.

9. The motion control device for the vehicle according to claim 8 further including a motion state quantity obtaining means for obtaining a motion state quantity of the vehicle, wherein the controlling means controls the braking force on the basis of the motion state quantity.

10. The motion control device for the vehicle according to claim 9, wherein the lateral force actual value obtaining means includes a braking force actual value obtaining means for obtaining a braking force actual value and calculates the lateral force actual value on the basis of the motion state quantity of the vehicle and the braking force actual value.

11. The motion control device for the vehicle according to claim 8 further including a wheel speed obtaining means for obtaining a wheel speed of the vehicle, wherein the controlling means restricts a longitudinal slip of the wheel by controlling the braking force on the basis of the wheel speed.

12. The motion control device for the vehicle according to claim 11, wherein the lateral force actual value obtaining means includes a vehicle behavior obtaining means for obtaining a motion state quantity of the vehicle and calculates the lateral force actual value on the basis of the motion state quantity.

13. The motion control device for the vehicle according to claim 1 further including a slip angle obtaining means for obtaining a slip angle of the wheel, wherein the lateral force reference value calculating means calculates the lateral force reference value acting on the wheel on the basis of the slip angle.

14. The motion control device for the vehicle according to claim 13, wherein the controlling means reduces the braking force in a case where the lateral force actual value is less than the lateral force reference value.

15. The motion control device for the vehicle according to claim 14 further including a motion state quantity obtaining means for obtaining a motion state quantity of the vehicle, wherein the controlling means controls the braking force on the basis of the motion state quantity.

16. The motion control device for the vehicle according to claim 15, wherein the lateral force actual value obtaining means includes a braking force actual value obtaining means for obtaining a braking force actual value and calculates the lateral force actual value on the basis of the motion state quantity of the vehicle and the braking force actual value.

17. The motion control device for the vehicle according to claim 14 further including a wheel speed obtaining means for obtaining a wheel speed of the vehicle, wherein the controlling means restricts a longitudinal slip of the wheel by controlling the braking force on the basis of the wheel speed.

18. The motion control device for the vehicle according to claim 17, wherein the lateral force actual value obtaining means includes a vehicle behavior obtaining means for obtaining a motion state quantity of the vehicle and calculates the lateral force actual value on the basis of the motion state quantity.

* * * * *